US 6,703,778 B2

(12) United States Patent
Watanabe et al.

(10) Patent No.: US 6,703,778 B2
(45) Date of Patent: Mar. 9, 2004

(54) LIGHT EMITTING ELEMENT, PLASMA DISPLAY PANEL, AND CRT DISPLAY DEVICE CAPABLE OF CONSIDERABLY SUPPRESSING A HIGH-FREQUENCY NOISE

(75) Inventors: Shinya Watanabe, Tokyo (JP); Koji Kamei, Kawasaki (JP); Hiroshi Ono, Yokohama (JP); Shigeyoshi Yoshida, Abiko (JP); Michio Nemoto, Sendai (JP)

(73) Assignee: NEC Tokin Corporation, Miyagi (JP)

( * ) Notice: Subject to any disclaimer, the term of this patent is extended or adjusted under 35 U.S.C. 154(b) by 154 days.

(21) Appl. No.: 09/826,145

(22) Filed: Apr. 4, 2001

(65) Prior Publication Data
US 2001/0035705 A1 Nov. 1, 2001

(30) Foreign Application Priority Data

| Apr. 4, 2000 | (JP) | 2000-102149 |
| Jun. 14, 2000 | (JP) | 2000-178013 |
| Aug. 8, 2000 | (JP) | 2000-239462 |

(51) Int. Cl.[7] .......................... H01J 29/88; H01J 11/00; H01F 10/14; H01F 10/16
(52) U.S. Cl. ...................... 313/479; 313/461; 313/466; 313/473; 313/477 R
(58) Field of Search ................... 313/461, 479, 313/477 R, 466, 473

(56) References Cited

U.S. PATENT DOCUMENTS 5,667,729 A  9/1997  Shimbori
5,804,912 A  9/1998  Park
6,034,744 A  3/2000  Lee
6,090,473 A  7/2000  Yoshikawa

FOREIGN PATENT DOCUMENTS

| EP | 1 00 22 070 | 1/1998 |
| EP | 0 848 386 A1 | 6/1998 |
| JP | 11 074682 A | 3/1999 |

OTHER PUBLICATIONS

Jae Y. Park & Mark G. Allen, Packaging Compatible Micromagnetic Devices Using Screen Printed Polymer/Ferrite Composites, The International Journal of Microcircuits and Electronic Packaging, Jul. 1, 1998, pp. 243–252, Vol 21, No.: 3, Atlanta, Georgia.
Electric Conducting Film Cathode Ray Tube Panel Fine Particle Electric Conducting Metal Oxide, Derwent Publications, Ltd., Oct. 8, 1999, London, GB.
European Search Report, Aug. 22, 2001.

*Primary Examiner*—Vip Patel
*Assistant Examiner*—Sharlene Leurig
(74) *Attorney, Agent, or Firm*—Bradley N. Ruben

(57) ABSTRACT

In a display device (70, 70A, 80–80G, 90–90F) having a display window (73, 81, 93), a magnetic loss layer or layer (75, 75A, 88–88C, 97–97C) is formed on at least a part of a principal surface of the display window. The magnetic loss layer may be a granular magnetic thin layer which is, for example, made of a magnetic substance of a magnetic composition comprising M, X and Y, where M is a metallic magnetic material consisting of Fe, Co, and/or Ni, X being element or elements other than M and Y, and Y being F, N, and/or O. The magnetic loss layer may be formed in any one selected from mat, lattice, stripe, and speck fashions. The magnetic loss layer may be formed in a mesh fashion.

33 Claims, 20 Drawing Sheets

LIGHT EMITTING ELEMENT, PLASMA DISPLAY PANEL, AND CRT DISPLAY DEVICE CAPABLE OF CONSIDERABLY SUPPRESSING A HIGH-FREQUENCY NOISE

BACKGROUND OF THE INVENTION

This invention relates to a display device such as a light emitting element having a light emitting window, a plasma display panel (PDP), and a cathode-ray tube (CRT) display device.

In recent years, highly integrated semiconductor devices operable at a high speed are remarkably wide spread and more and more increasingly used. As active devices using the semiconductor devices, there are known a random access memory (RAM), a read-only memory (ROM), a microprocessor (MPU), a central processing unit (CPU), and an image processor arithmetic logic unit (IPALU), and so on. The above-mentioned active devices are improved every minute so that an operation speed and/or a signal processing speed is rapidly increased. Under the circumstances, an electric propagated at a high speed is accompanied with drastic changes in electric voltage or electric current. Such changes constitute a main factor in generation of a high-frequency noise.

On the other hand, the reduction in weight, thickness, and size of electronic components or electronic apparatuses is endlessly making a rapid progress. This results in a remarkable increase in degree of integration of the semiconductor devices and in density of mounting the electronic components to a printed wiring board. In this event, electronic devices and signal lines densely integrated or mounted are very close to one another. Such high-density arrangement, in combination with the increase in signal processing speed mentioned above, will cause the high-frequency noise to be readily induced.

Such a high-frequency noise may be, for example, emitted from a light emitting element such as a laser diode for use in an optical pickup for an optical disk drive. This is because the laser diode may be operable at a high speed and the laser diode, in this case, emits or radiates not only light (infrared rays) but also the high-frequency noise.

However, in prior art, any measure is not taken for the high-frequency noise radiated from the above-mentioned light emission element.

On the other hand, as one of display devices, a plasma display panel (hereinafter which will be also referred to as "PDP") is known. In the manner which will later be described in conjunction with FIG. 12, a conventional plasma display panel comprises first and second glass substrates which are opposed to each other with a gap left therebetween. The first glass substrate is disposed at the front while the second glass substrate is disposed at the rear. Accordingly, the first glass substrate is called a front glass substrate while the second glass substrate is called a rear glass substrate. The front glass substrate and the rear glass substrate have first and second principal surfaces, respectively, at opposite sides. A plurality of front electrodes extend in a predetermined direction parallel to one another and are formed on the first principal surface of the front glass substrate. Each front electrode is formed as a transparent electrode which is made of a transparent material such as $SnO_2$, ITO, or the like. The plurality of front electrodes are covered with a first dielectric layer. A plurality of rear electrodes extend in a direction perpendicular to the predetermined direction parallel to one another and formed on the second principal surface of the rear glass substrate. Each rear electrode is made, for example, of Ag. The plurality of rear electrodes are covered with a second dielectric layer. A plurality of barrier ribs are disposed between the first and the second dielectric layers.

Such a plasma display panel is called an opposite discharge-type plasma display panel. The plasma display panel generates discharge rays between the front electrodes and the rear electrodes that are observed through the front electrodes acting as the transparent electrodes. Accordingly, the plasma display panel generates or radiates electromagnetic waves from all over the panel surface of the plasma display panel in accordance with the principle of its discharge. Those generated electromagnetic waves serve as interference electromagnetic waves in other parts or other apparatuses. As a measure for suppressing the interference electromagnetic waves, in the manner which will later be described in conjunction with FIG. 13, the front glass substrate is divided into two sub-substrates in a thickness direction and a conductive mesh is disposed between the two sub-substrates.

However, the measure for suppressing the interference electromagnetic waves with regard to the conventional plasma display panel becomes an issue as follows. At first, the conventional plasma display panel is disadvantageous in that the number of parts is increased and work hours required to assemble are also increased because the front substrate is divided into the two sub-substrates in the conventional plasma display panel. Secondly, the conductive mesh disposed within the front substrate results in degrading an optical characteristic of the PDP. Thirdly, as regards absorption of electromagnetic waves in the conductive mesh, the conductive mesh has a restricted frequency band up to a frequency band of the order of megahertz (MHz) that is capable of absorbing the electromagnetic waves. That is, the conventional plasma display panel is disadvantageous in that the conductive mesh cannot cope with absorption of the electromagnetic waves up to a frequency band of the order of gigahertz (GHz) which becomes an issue in resent years.

As another one of the display devices, a cathode-ray tube (hereinafter which will be also referred to as "CRT") display device is known. In the manner known in the art, the cathode-ray tube display device is used, for example, as a television (TV) picture tube of a television set, a monitor for a personal computer, or the like. Originally, a cathode-ray tube (CRT) is known as Braun tube or as an electron-ray tube. In the manner which will later be described in conjunction with FIG. 22, a conventional CRT display device comprises a cathode-ray tube or a glass vessel having an evacuated space inside and a deflecting yoke. The cathode-ray tube comprises a display panel having an inner surface, fluorescent substances having a predetermined pattern formed on the inner surface of the display panel, a shadow mask opposite to the display panel with the fluorescent substances disposed therebetween, and an electron gun. The electron gun radiates an electron beam which passes through one of hollow holes of the shadow mask and hits on a position of the fluorescent substances to make the position of the fluorescent substances emit.

The conventional CRT display device generates or radiates interference electromagnetic waves when the electron beam hits on the position of the fluorescent substances to make the position of the fluorescent substances emit. As a measure for suppressing the interference electromagnetic waves in the conventional CRT display device, in the manner which will later be described in conjunction with FIG. 23, a conductive mesh is embedded in the display panel in the cathode-ray tube.

However, the above-mentioned conventional CRT display device provided with the conductive mesh is disadvantageous in that image quality of the CRT display device is degraded because the conductive mesh interrupts emission in the fluorescent substances and the conductive mesh has a low absorption efficiency of the interference electromagnetic waves if the conductive mesh has a low arrangement density in order to improve the image quality. The above-mentioned conventional CRT display device provided with the conductive mesh is also disadvantageous in that a production cost thereof becomes high to embed the conductive mesh in the display panel. Furthermore, the conductive mesh has a frequency band enable to absorb the electromagnetic waves that is restricted up to a frequency band of the order of MHz. That is, the conventional CRT display device provided with the conductive mesh is disadvantageous in that the conductive mesh cannot cope with absorption of the electromagnetic waves up to a frequency band of the order of GHz which becomes an issue in resent years.

SUMMARY OF THE INVENTION

It is therefore an object of this invention to provide a display device which is capable of suppressing a high-frequency noise.

It is another object of this invention to provide a display device of the type described, which is capable of achieving the above-mentioned suppression effect with useless space.

It is an object of this invention to provide a plasma display panel which is capable of effectively absorbing interference electromagnetic waves within a frequency band between MHz and GHz.

It is another object of this invention to provide a plasma display panel of the type described, in which an emission characteristic of the plasma display panel is not disturbed.

It is still another object of this invention to provide a plasma display panel of the type described, which has superior quantity production.

It is an object of this invention to provide a CRT display device which is capable of effectively absorbing interference electromagnetic waves within a frequency band between MHz and GHz.

It is another object of this invention to provide a CRT display device of the type described, in which an emission characteristic of the CRT display device is not disturbed.

It is still another object of this invention to provide a CRT display device of the type described, which has superior quantity production.

Other objects of the present invention will become clear as the description proceeds.

According to a first aspect of the present invention, there is provided a display device having a display window with a principal surface. The display device comprises a magnetic loss layer formed on at least a part of the principal surface.

According to a second aspect of the present invention, there is provided a light emitting element having a light emitting window with a principal surface. The light emitting element comprises a magnetic loss layer formed on at least a part of the principal surface.

According to a third aspect of the present invention, there is provided a plasma display panel having a front glass substrate with an outer surface. The plasma display panel comprises a magnetic loss layer formed on the outer surface.

According to a fourth aspect of the present invention, there is provided a plasma display panel having a front glass substrate with an inner surface. The plasma display panel comprises a magnetic loss layer formed on the inner surface.

According to a fifth aspect of the present invention, there is provided a cathode-ray tube (CRT) display device comprising a cathode-ray tube having a display panel with an inner surface. The CRT display device comprises a magnetic loss layer formed on the inner surface.

According to a sixth aspect of the present invention, there is provided a cathode-ray tube (CRT) display device comprising a cathode-ray tube having a display panel with an outer surface. The CRT display device comprises a magnetic loss layer formed on the outer surface.

DESCRIPTION OF THE PREFERRED EMBODIMENTS

Before the description will be made as to display devices according to this invention, the description will be at first made to a magnetic loss layer for use in the display devices according to this invention. The magnetic loss layer has granular structure.

New, description will be made as to granular structure and production methods of M-X-Y magnetic composition.

Figure 1:
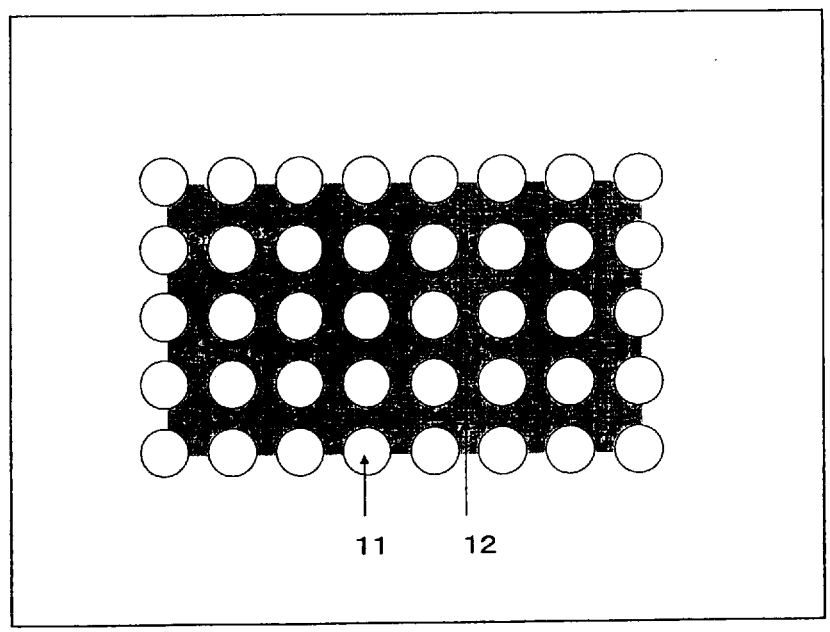
FIG. 1 is a schematic view showing a granular structure of M-X-Y magnetic composition.
Figure 2A:
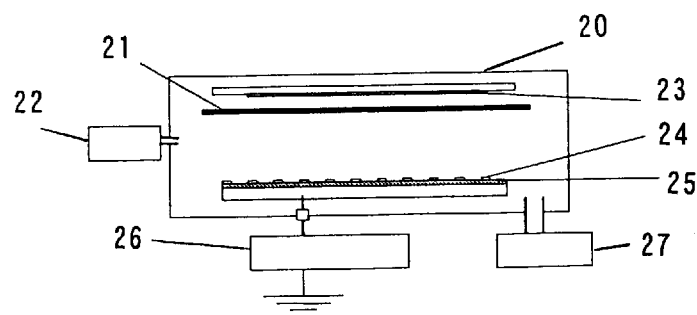
FIG. 2A is a schematic sectional view showing a structure of a sputtering apparatus which was used in examples.

Referring to FIG. 1 in which schematically shows the granular structure of M-X-Y magnetic composition, particles 11 of metallic magnetic material M are uniformly or evenly distributed in a matrix 12 consisting of X and Y. Referring to FIG. 2A, a sputtering apparatus shown therein was used for producing samples in the following examples and comparative examples. The sputtering apparatus has a conventional structure and comprises a vacuum container 20, a shutter 21, an atmospheric gas source 22, a substrate or a glass plate 23, chips 24 (X or X-Y), a target 25 (M), an RF power source, and a vacuum pump 27. The atmospheric gas source 22 and the vacuum pump 27 are connected to the vacuum container 20. The substrate 23 confronts to the target 25 on which chips 24 are disposed. The shutter 21 is disposed in front of the substrate 21. The RF power source 26 is connected to the target 25.

Figure 2B:
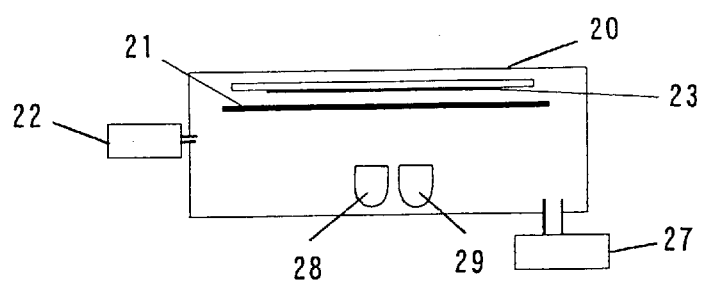
FIG. 2B is a schematic sectional view showing a structure of a vapor deposition apparatus which was used in examples.

Referring to FIG. 2B, a vapor deposition apparatus shown therein was also used another apparatus for producing samples in the following examples and comparative examples. The vapor deposition apparatus has a conventional structure and has vacuum container 20, atmospheric gas source 22, and vacuum pump 27 similar to the sputtering apparatus but has a crucible 28 including materials (X-Y) in place of chips 24, target 25 and RF power source 26.

EXAMPLE 1

A thin layer of M-X-Y magnetic composition was made on a glass plate by use of the sputtering apparatus shown in FIG. 2A at a sputtering condition shown in Table 1.

TABLE 1

| | |
|---|---|
| Vacuum degree before sputtering | $<1 \times 10^{-6}$ Torr |
| Atmosphere | Ar gas |
| Electric Power | RF |
| Targets | Fe (diameter of 100 mm) and $Al_2O_3$ chip (120 pieces) (chip size: 5 mm × 5 mm × 2 mm) |

The layer sample 1 produced was analyzed by a fluorescent X-ray spectroscopy and confirmed as a layer of a composition $Fe_{72}Al_{11}O_{17}$. The layer sample 1 had 2.0 micrometer ($\mu m$) in thickness, 530 micro ohm centimeters ($\mu\Omega\cdot cm$) in DC specific resistance, 18 Oe in anisotropy field (Hk), and 16,800 Gauss in saturation magnetization (Ms).

A percent ratio of the saturation magnetization of the layer sample 1 and that of the metallic material M itself {Ms(M-X-Y)/Ms(M)}×100 was 72.2%.

Figure 3:
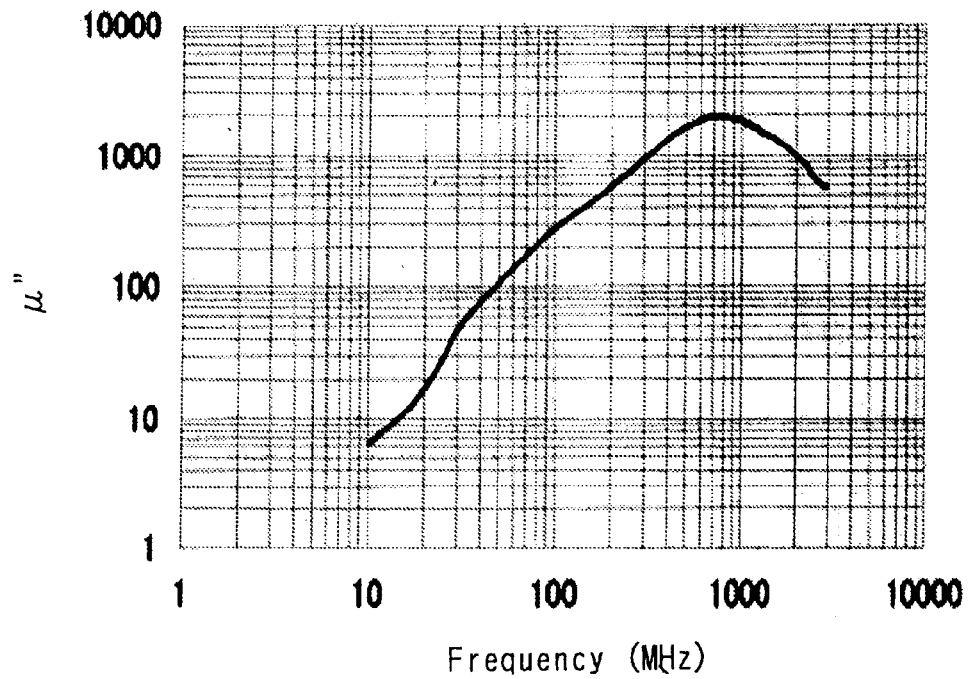
FIG. 3 is a graphical view showing a permeability frequency response of layer sample 1 in Example 1.

In order to measure a permeability frequency response, the layer sample 1 was formed in a ribbon like form and inserted in a coil. Under application of a bias magnetic field, an impedance variation of the coil was measured in response to frequency change of AC current applied to the coil. The measurement was several times for different values of the bias magnetic field. From the measured impedance variation in response to frequency variation, the permeability frequency response ($\mu''$-f response) was calculated and is shown in FIG. 3. It will be noted from FIG. 3 that the imaginary part of relative permeability has a high peak or the maximum value ($\mu''_{max}$) and rapidly falls either side of the peak. The natural resonance frequency ($f(\mu''_{max})$) showing the maximum value ($\mu''_{max}$) is about 700 MHz. From the $\mu''$-f response, a relative bandwidth bwr was determined as a percentage ratio of bandwidth between two frequency points which shows the imaginary part of relative permeability as a half value $\mu''_{50}$ of the maximum value $\mu''_{max}$, to center frequency of said bandwidth. The relative bandwidth bwr was 148%.

EXAMPLE 2

In a condition similar to that in Example 1 but using of 150 $Al_2O_3$ chips, a layer sample 2 was formed on a glass plate.

The layer sample 2 produced was analyzed by a fluorescent X-ray spectroscopy and confirmed as a layer of a composition $Fe_{44}Al_{22}O_{34}$. The layer sample 2 had 1.2 micrometer ($\mu$m) in thickness, 2400 micro ohm centimeters ($\mu\Omega\cdot$cm) in DC specific resistance, 120 Oe in anisotropy field (Hk), and 9600 Gauss in saturation magnetization (Ms). It will be noted that layer sample 2 is higher than layer sample 1 in the specific resistance.

A percent ratio of the saturation magnetization of the layer sample 2 and that of the metallic material M itself {Ms(M-X-Y)/Ms(M)}×100 was 44.5%.

Figure 4:
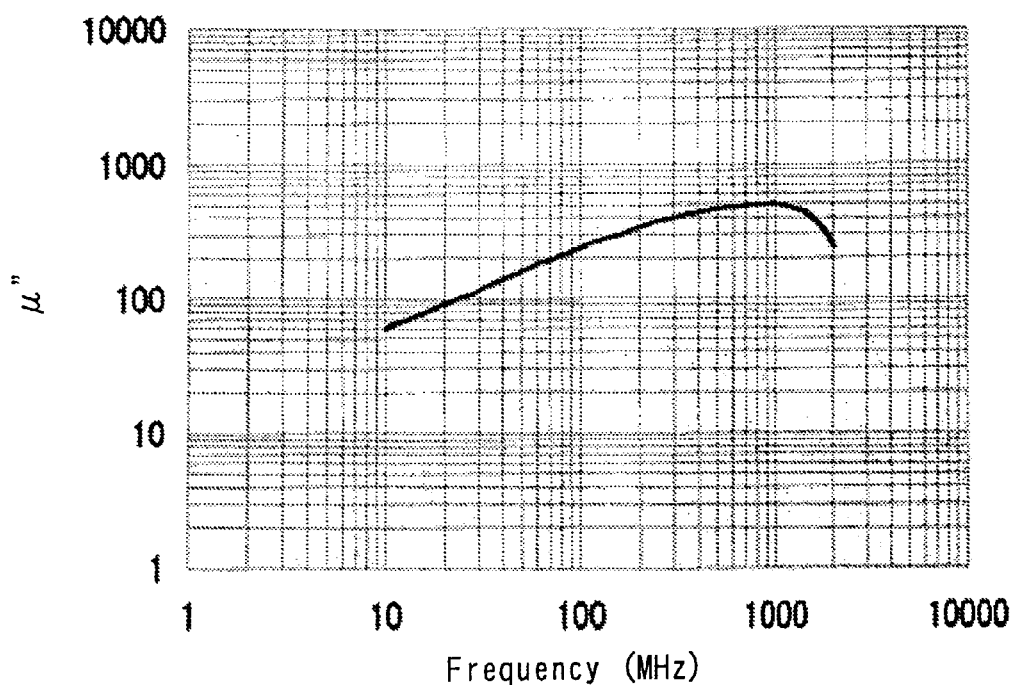
FIG. 4 is a graphical view showing a permeability frequency response of layer sample 2 in Example 2.

The $\mu''$-f response of layer sample 2 was also obtained in the similar manner as in Example 1 and shows in FIG. 4. It is noted that the peak has also a high value similar to that in layer sample 1. However, the frequency point at the peak, or the natural resonance frequency is about 1 GHz and the imaginary part of relative permeability gradually falls either side of the peak so that the $\mu''$-f response has a broadband characteristic.

A relative bandwidth bwr of layer sample 2 was also confirmed as 181% by the similar way as in Example 1.

COMPARATIVE EXAMPLE 1

In a condition similar to that in Example 1 but using of 90 $Al_2O_3$ chips, a comparative sample 1 was formed on a glass plate.

The comparative sample 1 produced was analyzed by a fluorescent X-ray spectroscopy and confirmed as a layer of a composition $Fe_{86}Al_6O_8$. The comparative sample 1 had 1.2 micrometer ($\mu$m) in thickness, 74 micro ohm centimeters ($\mu\Omega\cdot$cm) in DC specific resistance, 22 Oe in anisotropy field (Hk), 18,800 Gauss in saturation magnetization (Ms), and 85.7% in a percent ratio of the saturation magnetization of the comparative sample 1 and that of the metallic material M itself {Ms(M-X-Y)/Ms(M)}×100, and was 44.5%.

Figure 5:
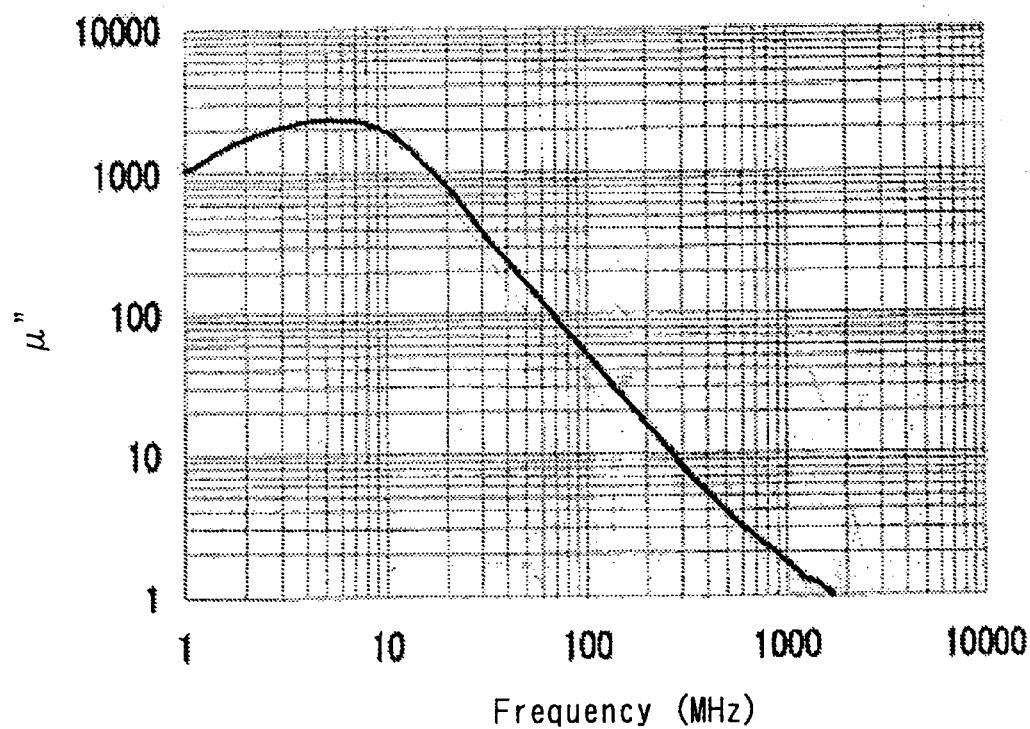
FIG. 5 is a graphical view showing a permeability frequency response of comparable sample 1 in Comparable Example 1.

The $\mu''$-f response of comparative sample 1 was also obtained in the similar manner as in Example 1, and is shown in FIG. 5. It will be noted from FIG. 5 that the imaginary part $\mu''$ of relative permeability of the comparative sample 1 has a high peak at a frequency about 10 MHz but rapidly reduces at the higher frequency range than 10 MHz. It can be supposed that this reduction is caused by generation of eddy current due to the lower specific resistance.

COMPARATIVE EXAMPLE 2

In a condition similar to that in Example 1 but using of 200 $Al_2O_3$ chips, a comparative sample 2 was formed on a glass plate.

The comparative sample 2 produced was analyzed by a fluorescent X-ray spectroscopy and confirmed as a layer of a composition $Fe_{19}Al_{34}O_{47}$. The comparative sample 2 had 1.3 micrometer ($\mu$m) in thickness, 10,500 micro ohm centimeters ($\mu\Omega\cdot$cm) in DC specific resistance.

The magnetic characteristic of comparative sample 2 exhibited superparamagnetism.

EXAMPLE 4

A thin layer of M-X-Y magnetic composition was made on a glass plate by the reactive sputtering method using the sputtering apparatus shown in FIG. 2A at a sputtering condition shown in Table 2. The partial pressure ratio of $N_2$ was 20%. The thin layer was heat-treated at a temperature of 300° C. for two hours in vacuum under magnetic field and obtained a layer sample 4.

TABLE 2

| | |
|---|---|
| Vacuum degree before sputtering | <1 × 10$^{-6}$ Torr |
| Atmosphere | Ar + N$_2$ gas |
| Electric Power | RF |
| Targets | Fe (diameter of 100 mm) and Al chip (150 pieces) (chip size: 5 mm × 5 mm × 2 mm) |

The properties of layer sample 4 are show in Table 3.

TABLE 3

| | |
|---|---|
| Layer thickness | 1.5 $\mu$m |
| {Ms(M-X-Y)/Ms(M)} × 100 | 51.9% |
| $\mu''_{max}$ | 520 |
| f($\mu''_{max}$) | 830 MHz |
| bwr | 175% |

EXAMPLE 5

A thin layer of M-X-Y magnetic composition was made on a glass plate by using the sputtering apparatus shown in FIG. 2A at a sputtering condition shown in Table 4. The thin layer was heat-treated at a temperature of 300° C. for two hours in vacuum under magnetic field and obtained a layer sample 5.

TABLE 4

| | |
|---|---|
| Vacuum degree before sputtering | <1 × 10$^{-6}$ Torr |
| Atmosphere | Ar gas |
| Electric Power | RF |
| Targets | Co (diameter of 100 mm) and Al$_2$O$_3$ chip (130 pieces) (chip size: 5 mm × 5 mm × 2 mm) |

The properties of layer sample 5 are show in Table 5.

TABLE 5

| | |
|---|---|
| Layer thickness | 1.1 $\mu$m |
| {Ms(M-X-Y)/Ms(M)} × 100 | 64.7% |
| $\mu''_{max}$ | 850 |
| f($\mu''_{max}$) | 800 MHz |
| bwr | 157% |

EXAMPLE 6

A thin layer of M-X-Y magnetic composition was made on a glass plate by the reactive sputtering method using the sputtering apparatus shown in FIG. 2A at a sputtering condition shown in Table 6. The partial pressure ratio of $N_2$ was 10%. The thin layer was heat-treated at a temperature of 300° C. for two hours in vacuum under magnetic field and obtained a layer sample 6.

TABLE 6

| | |
|---|---|
| Vacuum degree before sputtering | <1 × 10$^{-6}$ Torr |
| Atmosphere | Ar + N$_2$ gas |
| Electric Power | RF |
| Targets | Co (diameter of 100 mm) and Al chip (170 pieces) (chip size: 5 mm × 5 mm × 2 mm) |

The properties of layer sample 6 are show in Table 7.

TABLE 7

| Layer thickness | 1.2 μm |
|---|---|
| {Ms(M-X-Y)/Ms(M)} × 100 | 32.7% |
| $\mu''_{max}$ | 350 |
| $f(\mu''_{max})$ | 1 GHz |
| bwr | 191% |

EXAMPLE 7

A thin layer of M-X-Y magnetic composition was made on a glass plate by using the sputtering apparatus shown in FIG. 2A at a sputtering condition shown in Table 8. The thin layer was heat-treated at a temperature of 300° C. for two hours in vacuum under magnetic field and obtained a layer sample 7.

TABLE 8

| Vacuum degree before sputtering | <1 × 10$^{-6}$ Torr |
|---|---|
| Atmosphere | Ar gas |
| Electric Power | RF |
| Targets | Ni (diameter of 100 mm) and Al$_2$O$_3$ chip (140 pieces) (chip size: 5 mm × 5 mm × 2 mm) |

The properties of layer sample 4 are show in Table 9.

TABLE 9

| Layer thickness | 1.7 μm |
|---|---|
| {Ms(M-X-Y)/Ms(M)} × 100 | 58.2% |
| $\mu''_{max}$ | 280 |
| $f(\mu''_{max})$ | 240 MHz |
| bwr | 169% |

EXAMPLE 8

A thin layer of M-X-Y magnetic composition was made on a glass plate by the reactive sputtering method using the sputtering apparatus shown in FIG. 2A at a sputtering condition shown in Table 10. The partial pressure ratio of N$_2$ was 10%. The thin layer was heat-treated at a temperature of 300° C. for two hours in vacuum under magnetic field and obtained a layer sample 8.

TABLE 10

| Vacuum degree before sputtering | <1 × 10$^{-6}$ Torr |
|---|---|
| Atmosphere | Ar + N$_2$ gas |
| Electric Power | RF |
| Targets | Ni (diameter of 100 mm) and Al chip (100 pieces) (chip size: 5 mm × 5 mm × 2 mm) |

The properties of layer sample 10 are show in Table 11.

TABLE 11

| Layer thickness | 1.3 μm |
|---|---|
| {Ms(M-X-Y)/Ms(M)} × 100 | 76.2% |
| $\mu''_{max}$ | 410 |
| $f(\mu''_{max})$ | 170 MHz |
| bwr | 158% |

EXAMPLE 9

A thin layer of M-X-Y magnetic composition was made on a glass plate by using the sputtering apparatus shown in FIG. 2A at a sputtering condition shown in Table 12. The thin layer was heat-treated at a temperature of 300° C. for two hours in vacuum under magnetic field and obtained a layer sample 9.

TABLE 12

| Vacuum degree before sputtering | <1 × 10$^{-6}$ Torr |
|---|---|
| Atmosphere | Ar gas |
| Electric Power | RF |
| Targets | Fe (diameter of 100 mm) and TiO$_2$ chip (150 pieces) (chip size: 5 mm × 5 mm × 2 mm) |

The properties of layer sample 9 are show in Table 13.

TABLE 13

| Layer thickness | 1.4 μm |
|---|---|
| {Ms(M-X-Y)/Ms(M)} × 100 | 43.6% |
| $\mu''_{max}$ | 920 |
| $f(\mu''_{max})$ | 1.5 GHz |
| bwr | 188% |

EXAMPLE 10

A thin layer of M-X-Y magnetic composition was made on a glass plate by the reactive sputtering method using the sputtering apparatus shown in FIG. 2A at a sputtering condition shown in Table 14. The partial pressure ratio of O$_2$ was 15%. The thin layer was heat-treated at a temperature of 300° C. for two hours in vacuum under magnetic field and obtained a layer sample 10.

TABLE 14

| Vacuum degree before sputtering | <1 × 10$^{-6}$ Torr |
|---|---|
| Atmosphere | Ar + O$_2$ gas |
| Electric Power | RF |
| Targets | Fe (diameter of 100 mm) and Si chip (130 pieces) (chip size: 5 mm × 5 mm × 2 mm) |

The properties of layer sample 10 are show in Table 15.

TABLE 15

| Layer thickness | 1.5 μm |
|---|---|
| {Ms(M-X-Y)/Ms(M)} × 100 | 55.2% |
| $\mu''_{max}$ | 920 |
| $f(\mu''_{max})$ | 1.2 GHz |
| bwr | 182% |

EXAMPLE 11

A thin layer of M-X-Y magnetic composition was made on a glass plate by using the sputtering apparatus shown in FIG. 2A at a sputtering condition shown in Table 16. The thin layer was heat-treated at a temperature of 300° C. for two hours in vacuum under magnetic field and obtained a layer sample 11.

TABLE 16

| Vacuum degree before sputtering | <1 × 10$^{-6}$ Torr |
|---|---|
| Atmosphere | Ar gas |
| Electric Power | RF |
| Targets | Fe (diameter of 100 mm) and HfO$_3$ chip (100 pieces) (chip size: 5 mm × 5 mm × 2 mm) |

The properties of layer sample 11 are show in Table 17.

TABLE 17

| Layer thickness | 1.8 μm |
| --- | --- |
| {Ms(M-X-Y)/Ms(M)} × 100 | 77.4% |
| $\mu''_{max}$ | 1800 |
| f($\mu''_{max}$) | 450 MHz |
| bwr | 171% |

EXAMPLE 12

A thin layer of M-X-Y magnetic composition was made on a glass plate by using the sputtering apparatus shown in FIG. 2A at a sputtering condition shown in Table 18. The thin layer was heat-treated at a temperature of 300° C. for two hours in vacuum under magnetic field and obtained a layer sample 12.

TABLE 18

| Vacuum degree before sputtering | <1 × 10⁻⁶ Torr |
| --- | --- |
| Atmosphere | Ar gas |
| Electric Power | RF |
| Targets | Fe (diameter of 100 mm) and BN chip (130 pieces) (chip size: 5 mm × 5 mm × 2 mm) |

The properties of layer sample 12 are show in Table 19.

TABLE 19

| Layer thickness | 1.9 μm |
| --- | --- |
| {Ms(M-X-Y)/Ms(M)} × 100 | 59.3% |
| $\mu''_{max}$ | 950 |
| f($\mu''_{max}$) | 680 MHz |
| bwr | 185% |

EXAMPLE 13

A thin layer of M-X-Y magnetic composition was made on a glass plate by using the sputtering apparatus shown in FIG. 2A at a sputtering condition shown in Table 20. The thin layer was heat-treated at a temperature of 300° C. for two hours in vacuum under magnetic field and obtained a layer sample 13.

TABLE 20

| Vacuum degree before sputtering | <1 × 10⁻⁶ Torr |
| --- | --- |
| Atmosphere | Ar gas |
| Electric Power | RF |
| Targets | Fe$_{50}$Co$_{50}$ (diameter of 100 mm) and Al$_2$O$_3$ chip (130 pieces) (chip size: 5 mm × 5 mm × 2 mm) |

The properties of layer sample 13 are show in Table 21.

TABLE 21

| Layer thickness | 1.6 μm |
| --- | --- |
| {Ms(M-X-Y)/Ms(M)} × 100 | 59.3% |
| $\mu''_{max}$ | 720 |
| f($\mu''_{max}$) | 1.1 GHz |
| bwr | 180% |

EXAMPLE 14

A thin layer of M-X-Y magnetic composition was made on a glass plate by using the vapor deposition apparatus shown in FIG. 2B at a condition shown in Table 22. The thin layer was heat-treated at a temperature of 300° C. for two hours in vacuum under magnetic field and obtained a layer sample 14.

TABLE 22

| Vacuum degree before sputtering | <1 × 10⁻⁶ Torr |
| --- | --- |
| Atmosphere flowing rate | O$_2$ at 3.0 sccm |
| Elements in crucible 28 and 29 | Fe and Al |

The properties of layer sample 14 are show in Table 23.

TABLE 23

| Layer thickness | 1.1 μm |
| --- | --- |
| {Ms(M-X-Y)/Ms(M)} × 100 | 41.8% |
| $\mu''_{max}$ | 590 |
| f($\mu''_{max}$) | 520 MHz |
| bwr | 190% |

Now, description will be made as to tests relating to noise suppressing effect of sample layers and comparative samples, using a test apparatus shown in FIG. 6.

A test piece was layer sample 1 with dimensions of 20 mm×20 mm×2.0 μm. For a comparison, a sheet of known composite magnetic material having dimensions of 20 mm×20 mm×1.0 mm. The composite magnetic material comprising polymer and flat magnetic metal powder dispersed in the polymer. The magnetic metal powder comprises Fe, Al and Si. The composite magnetic material has a permeability distribution in quasi-microwave range and has the maximum value of the imaginary part of relative permeability at a frequency about 700 MHz. Table 24 shows magnetic properties of both of the test piece and comparative test piece.

TABLE 24

| | Layer sample 1 | Comparative test piece |
| --- | --- | --- |
| $\mu''$/700 MHz | about 1800 | about 3.0 |
| bwr | 148 | 196 |

As seen from Table 24, the layer sample 1 is about 600 times more than comparative test piece in the maximum value of the imaginary part of relative permeability. Since the noise suppressing effect is generally evaluated from a value of a product ($\mu''_{max} \times \delta$) of the maximum value $\mu''_{max}$ of the imaginary part of relative permeability and thickness of the piece δ, the thickness of the comparative test piece of the composite magnetic material sheet was selected 1 mm so that the both of test pieces have the similar values of ($\mu''_{max} \times \delta$).

Figure 6:
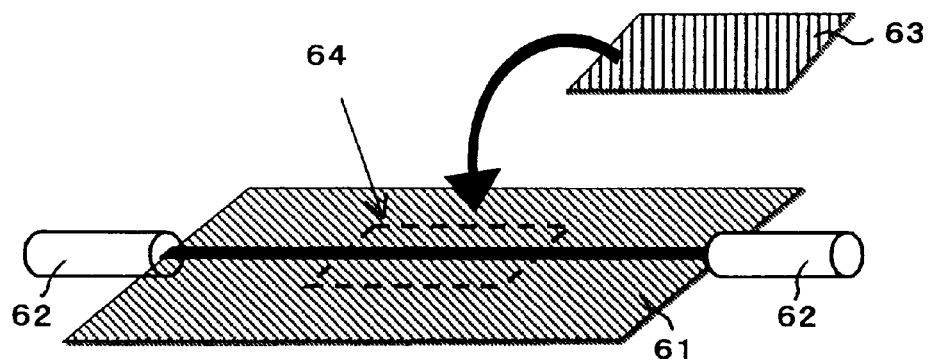
FIG. 6 is a schematic and perspective view of a test apparatus for testing a noise suppressing effect of magnetic samples.

Referring to FIG. 6, the test apparatus comprises a microstrip line 61 having two ports, coaxial cables 62 connected to the two ports, and a network analyzer (not shown) connected across the two ports. The micro-strip line 61 has a line length of 75 mm and a characteristic impedance of 50 ohms. The test piece 63 was disposed at a region 64 on the micro-strip line 61 and the transmission characteristic S21 was measured. The frequency response of S21 are shown in FIGS. 11A and 11B for layer sample 1 and the comparative sample, respectively.

Figure 7A:
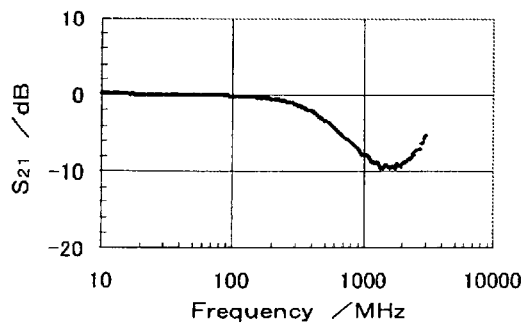
FIG. 7A is a graphic view showing a transmission characteristic of layer sample 1.
Figure 7B:
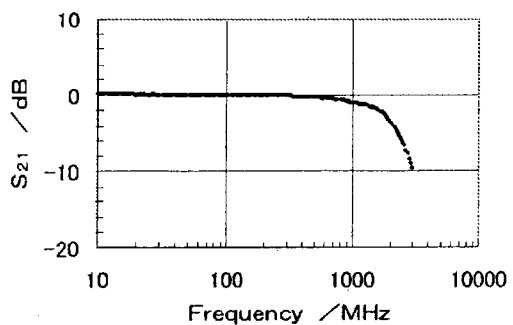
FIG. 7B is a graphic view showing a transmission characteristic of comparable sample of composite magnetic material sheet.

With respect to use of layer sample 1, it will be noted from FIG. 7A that S21 reduces above 100 MHz, becomes to the minimum of −10 dB at a frequency of 2 GHz and then increases above 2 GHz. On the other hand, with respect to use of comparative sample, it will be noted from FIG. 7B that S21 gradually reduces and becomes to the minimum of −10 dB at a frequency of 3 GHz.

The results demonstrate that S21 is dependent on the frequency distribution of the permeability and that the noise suppressing effect is dependent on the product of $(\mu''_{max} \times \delta)$.

Figures 8A, 8B, 8C:
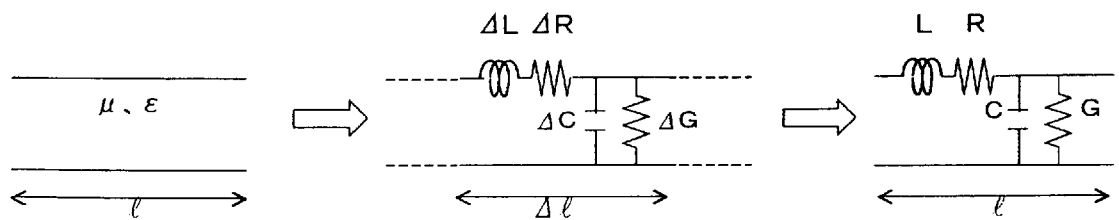
FIG. 8A is a distribution constant circuit with a length l showing a magnetic material as a noise suppressor.
FIG. 8B is an equivalent circuit with a unit length Δl of the distribution constant circuit of FIG. 12A.
FIG. 8C is an equivalent circuit with a length l of the distribution constant circuit of FIG. 12A.

Now, providing that the magnetic sample forms a distribution constant circuit having a length of f as shown in FIG. 8A, an equivalent circuit was calculated for a unit length of Δl from transmission characteristics S11 and S21, as shown in FIG. 8B. Then, the equivalent circuit for the length l was obtained from the equivalent circuit for the unit length Δl, as shown in FIG. 8C. The equivalent circuit of the magnetic sample comprises series inductance L and resistance R and parallel capacitance C and conductance G, as shown in FIG. 8C. From this, it will be understood that the change of transmission characteristic of the micro-strip line caused due to disposition of the magnetic substance on the micro-strip line is mainly determined by the equivalent resistance R added in series.

Figure 9A:
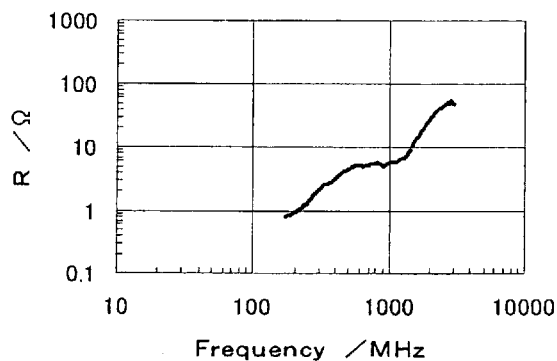
FIG. 9A is a graphic view showing a frequency response of an equivalent resistance R of layer sample 1 in Example 1.
Figure 9B:
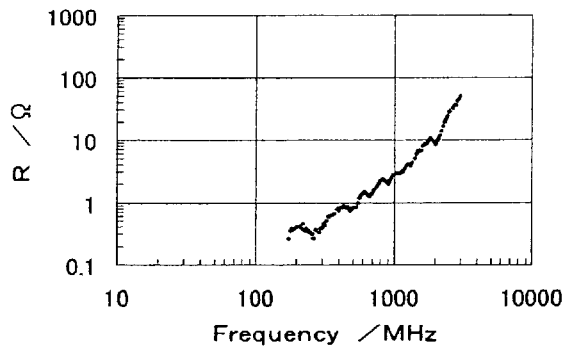
FIG. 9B is a graphic view showing a frequency response of an equivalent resistance R of comparative sample of a composite magnetic material sheet.

In view of the above, a frequency response of the equivalent resistance R was measured. The measured data were shown in FIGS. 9A and 9B for the layer sample 1 and the comparative sample, respectively. It will be noted from these figures that the equivalent resistance R gradually reduces in the quasi-microwave range and is about 60 ohms at about 3 GHz. It is seen that the frequency dependency of the equivalent resistance R is different from that of the imaginary part of relative permeability which has the maximum value at about 1 GHz. It will be supposed that this difference will be based on the gradual increase of a ratio of the product and the sample length to the wavelength.

Figure 10:
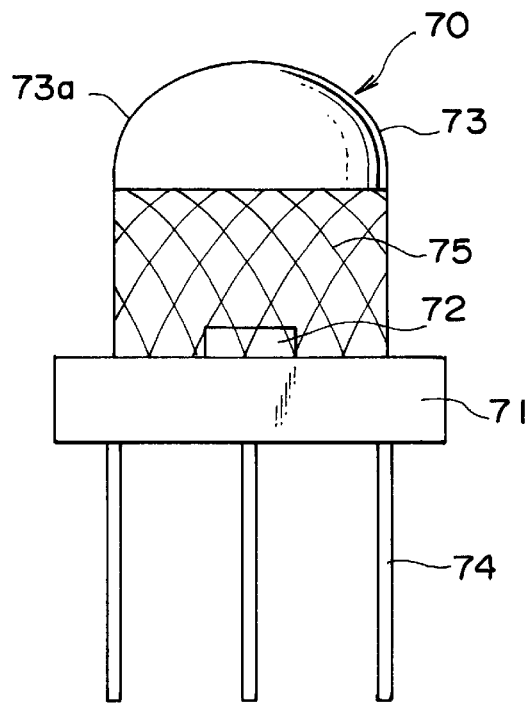
FIG. 10 is a front view of a light emitting element (laser diode) according to an embodiment of this invention.

Referring to FIG. 10, description will be made of a display device according to an embodiment of this invention. The illustrated display device exemplifies a light emitting element 70. The illustrated light emitting element 70 is a laser diode for use in an optical pickup for an optical disk drive.

The light emitting element (laser diode) 70 comprises a base 71, a laser diode chip 72 mounted on the base 71, a resinous light emitting window 73 attached to the base 71 so as to cover the laser diode chip 71, and three legs 74 extending from the base in the opposite direction to the light emitting window 73. The light emitting window 73 serves as a display window of the display device. The light emitting window 73 has a principal surface 73a.

In the light emitting element (laser diode) 70 having such a structure, according to the first embodiment of this invention, a magnetic loss layer or film 75 is formed on a lower part (the base 71 side) of the principal surface 73a of the light emitting window 73. In the example being illustrated, the magnetic loss layer 75 is formed in a mesh fashion. In other words, the magnetic loss layer 75 is a meshed magnetic loss layer.

The reason why the meshed magnetic loss layer 75 is formed on the lower part of the principal surface 73a of the light emitting window 73 is that a laser beam emitted from the laser diode chip 72 is not interrupted by the meshed magnetic loss layer 75 to pass through the light emitting window 73.

As the meshed magnetic loss layer 75, a granular magnetic thin layer or film may be used in the manner which is described above. Such a granular magnetic thin layer may be manufactured by using sputtering process, vapor deposition process, or reactive sputtering process. In other words, the granular magnetic thin layer may be a sputtered film formed by the sputtering process or the reactive sputtering process or a vapor-deposited film formed by the vapor deposition process. Upon manufacturing the granular magnetic thin layer, the above-mentioned sputtered film or the above-mentioned vapor-deposited film are really heat-treated at a predetermined temperature for a predetermined time interval in vacuum under magnetic field.

In the above-mentioned embodiment of this invention, inasmuch as it is necessary to form the magnetic loss layer (granular magnetic thin layer) 75 in the mesh fashion, such a meshed magnetic loss layer may be a sputtered film formed by the sputtering process using a mask, a vapor-deposited film formed by the vapor deposition process using a mask, or a crosshatched film formed by crosshatching a magnetic loss wire made of a granular magnetic material.

The present inventors already confirmed in an experiment that the granular magnetic thin layer formed in the manner as described above has a very large magnetic loss in a high frequency within the frequency band between several tens of MHz and several GHz although the granular magnetic thin layer has a thin film thickness of, for example, 2.0 μm or less.

In addition, the present inventors already confirmed in an experiment that the granular magnetic thin layer, which has dispersion of an imaginary part (i.e., a "magnetic loss term") $\mu''$ of relative permeability in a quasi-microwave band, according to this invention has a high-frequency noise suppression effect which is equivalent to that in a conventional complex magnetic sheet having a thickness of about five hundreds times as large as a thickness of the granular magnetic thin layer. Accordingly, the granular magnetic thin layer according to this invention is in prospect as a magnetic substance adapted for use in suppression of electromagnetic interference (EMI) in, for example, a semiconductor integrated element which is operable at a high-speed clock of about 1 GHz.

Although examples manufactured by using the sputtering process using the mask, the vapor deposition process, or the reactive sputtering process are exemplifies as methods of manufacturing the granular magnetic thin layers in the embodiment of this invention, other manufacturing methods such as vacuum deposition process, ion beam deposition process, or gas deposition process may be used upon forming the granular magnetic thin layers. Manufacturing methods may be not restricted if the methods can uniformly form the magnetic loss layer according to this invention.

In addition, although the heat treatment after layer production is carried out in vacuum under magnetic field in the above-mentioned embodiment, the heat treatment after layer production is not necessary if the granular magnetic thin layer is a layer which is formed by the gas deposition process and which has a composition or a layer production method where performance of this invention is obtained.

Figure 11:
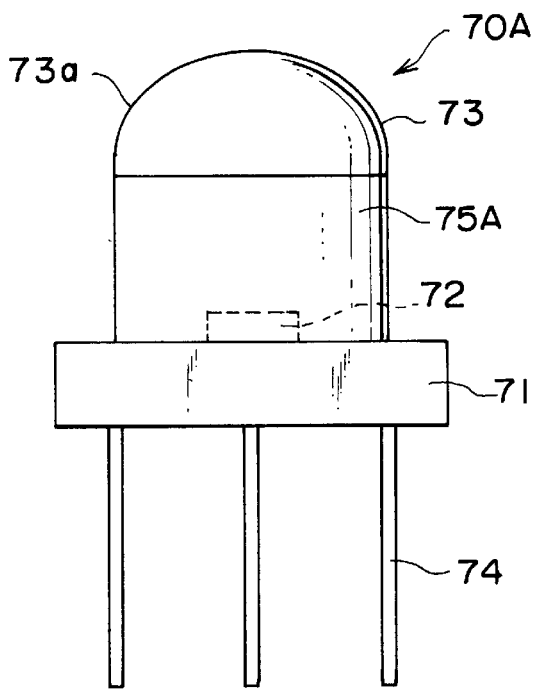
FIG. 11 is a front view of a light emitting element (laser diode) according to another embodiment of this invention.

Furthermore, although the laser diode is exemplified as the light emitting element 70 and the magnetic loss layer 75 is formed on the principal surface 73a of the light emitting window 73 of the later diode in the above-mentioned embodiment, the display device may be a infrared I/O unit of a remote controller and the magnetic loss layer may be formed on a principal surface of a light emitting window thereof. The display device may be a liquid crystal display device of an active-matrix type comprising a plurality of thin layer transistors (TFTs) and the magnetic loss layer may be formed on a principal surface of a display window thereof. In addition, although the meshed magnetic loss layer 75 is formed on a part of the principal surface 73a of the light emitting window 73 in the light emitting element 70 in the above-mentioned embodiment, the meshed magnetic loss layer may be, for example, formed on all over the principal surface 73a of the light emitting window 73. The magnetic loss layer may be formed in a stripe fashion, a lattice fashion, or a checker fashion in place of the mesh fashion. At any rate, the magnetic loss layer may be formed with space. Although the description is exemplified in the above-mentioned embodiment in a case where the magnetic loss layer 75 of the light emitting element 70 is formed in the mesh fashion, as shown in FIG. 11, a sheet-like magnetic loss layer 75A of a light emitting element 70A may cover, in a case of forming the magnetic loss layer in only the lower part of the principal surface 73a of the light emitting window 73, all of the lower part of the principal surface 73a of the light emitting window 73 so that the laser beam emitted form the laser diode chip 72 is not intercepted to pass though the light emitting window 73.

In addition, although the description is exemplified in a case where the magnetic loss layer 75 is the granular magnetic thin layer in the above-mentioned embodiment, the magnetic loss layer 75 may not be restricted to the granular magnetic thin layer and may be any layer having a very large magnetic loss in a high frequency within the frequency band between several tens of MHz and several GHz.

Figure 12:
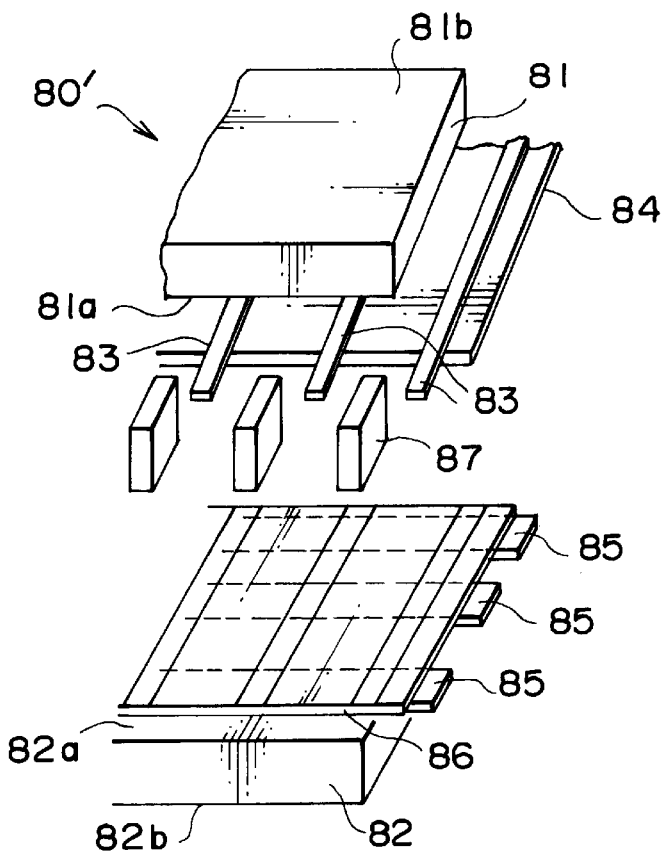
FIG. 12 is an exploded perspective view showing a part of a conventional plasma display panel.

Referring to FIG. 12, the description will proceed to a conventional plasma display panel (PDP) 80' used as one of the display devices. The plasma display panel 80' comprises first and second glass substrates 81 and 82 which are opposed to each other with a gap left therebetween. The first glass substrate 81 is disposed at the front while the second glass substrate 82 is disposed at the rear. Accordingly, the first glass substrate 81 is called a front glass substrate while the second glass substrate 82 is called a rear glass substrate. The front glass substrate 81 serves as the display window. The front glass substrate 81 and the rear glass substrate 82 have front and rear inner surfaces 81a and 82a, respectively, at opposite inner sides and front and rear outer surfaces 81b and 82b, respectively, at opposite outer sides. A plurality of front electrodes 83 extend in a predetermined direction parallel to one another and are formed on the front inner surface 81a of the front glass substrate 81 in strips. Each front electrode 83 is formed as a transparent electrode which is made of a transparent material such as $SnO_2$, ITO, or the like. The plurality of front electrodes 83 are covered with a first dielectric layer 84. A plurality of rear electrodes 85 extend in a direction perpendicular to the predetermined direction parallel to one another and formed on the rear inner surface 82a of the rear glass substrate 82 in strips. Each rear electrode 85 is made, for example, of Ag. The plurality of rear electrodes 85 are covered with a second dielectric layer 86. A plurality of barrier ribs 87 are disposed between the first and the second dielectric layers 84 and 85.

Dischargeable rare gas (not shown) is enclosed in the space between the front and the rear glass substrates 81 and 82 with the circumference sealed tightly. The space is partitioned into a plurality of partial spaces by the barrier ribs, as shown in FIG. 12. The dischargeable rare gas generates a lot of ultraviolet rays on discharging.

Figure 13:
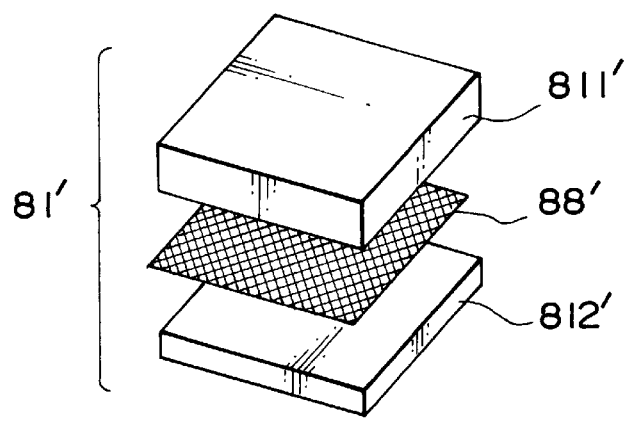
FIG. 13 is an exploded perspective view of a conventional front glass substrate as noise measure for use in the conventional plasma display panel illustrated in FIG. 12.

Such a plasma display panel 80' is called an opposite discharge-type plasma display panel. The plasma display panel 80' generates discharge rays between the front electrodes 84 and the rear electrodes 85 that are observed through the front electrodes 83 acting as the transparent electrodes. Accordingly, the plasma display panel 80' generates or radiates electromagnetic waves from all over the panel surface of the plasma display panel 80' in accordance with the principle of its discharge. Those generated electromagnetic waves serve as interference electromagnetic waves in other parts or other apparatuses. As a measure for suppressing the interference electromagnetic waves, as illustrated in FIG. 13, a front glass substrate 81' is divided into two sub-substrates 811' and 812' in a thickness direction and a conductive mesh 88' is disposed or sandwiched between the two sub-substrates 811' and 812'.

However, the measure for suppressing the interference electromagnetic waves with regard to the conventional plasma display panel becomes an issue as follows. At first, the conventional plasma display panel is disadvantageous in that the number of parts is increased and work hours required to assemble are also increased because the front substrate 81' is divided into the two sub-substrates 811' and 812' in the conventional plasma display panel. Secondly, the conductive mesh 88' disposed within the front substrate 81' results in degrading an optical characteristic of the PDP. Thirdly, as regards absorption of electromagnetic waves in the conductive mesh 88', the conductive mesh 88' has a restricted frequency band up to a frequency band of the order of MHz that is capable of absorbing the electromagnetic waves. That is, the conventional plasma display panel is disadvantageous in that the conductive mesh 88' cannot cope with absorption of the electromagnetic waves up to a frequency band of the order of GHz which becomes an issue in resent years, as mentioned in the preamble of the instant specification.

Figure 14:
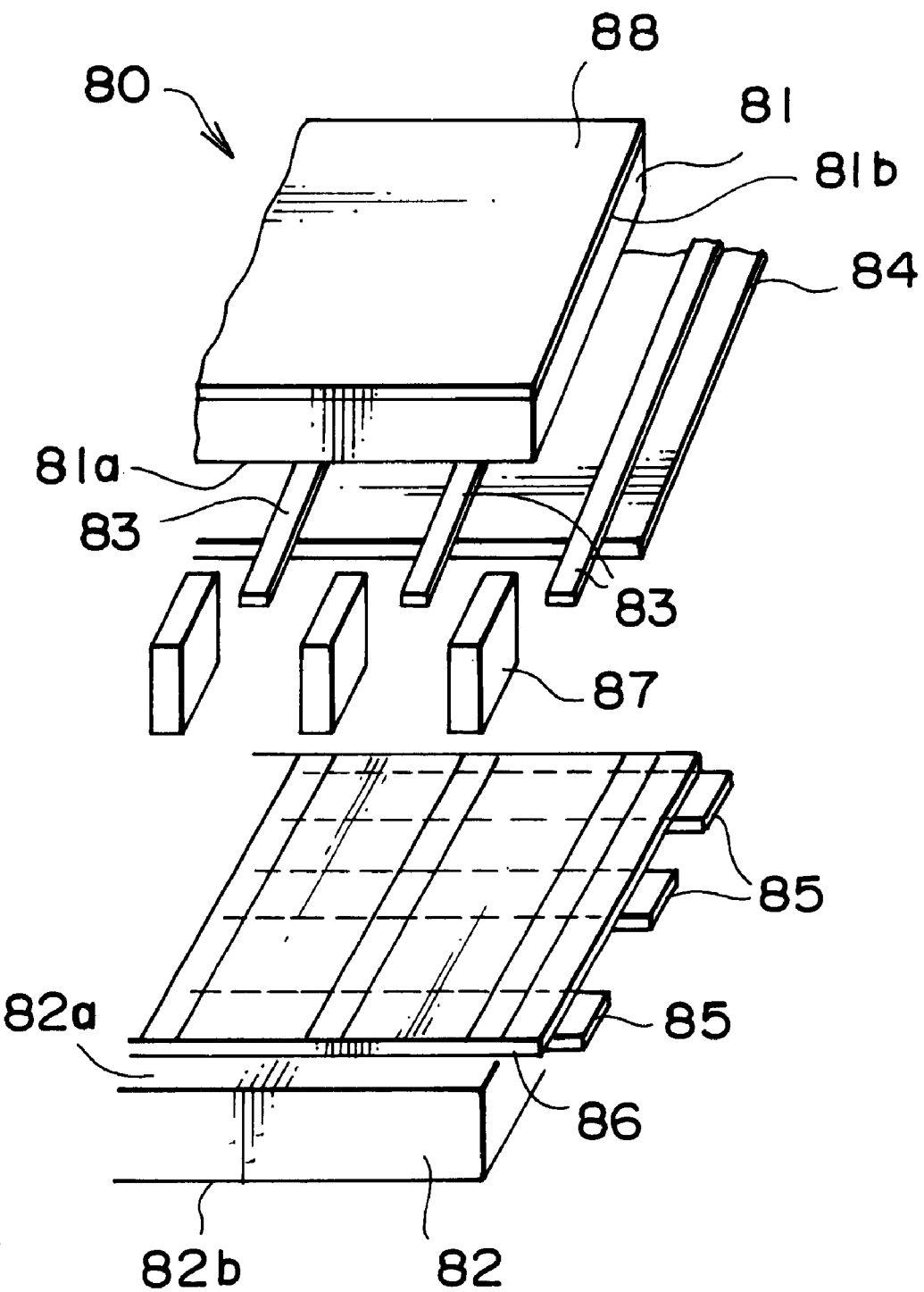
FIG. 14 is an exploded perspective view of a part of a plasma display panel according to a first embodiment of this invention.

Referring to FIG. 14, the description will proceed to a plasma display panel (PDP) 80 according to a first embodiment of this invention. The plasma display panel 80 is similar in structure and operation to the conventional display panel 80' illustrated in FIG. 12 except that the plasma display panel 80 further comprises a magnetic loss layer 88.

The magnetic loss layer 88 is formed on the front outer surface 81b of the front substrate 81. In the example being illustrated, the magnetic loss layer 88 is formed in a mat fashion. In other words, the magnetic loss layer 88 is a sheet-like magnetic loss layer for covering a whole surface of the front outer surface 81b of the front substrate 81.

The sheet-like magnetic loss layer 88 is made of a magnetic substance of a magnetic composition comprising M, X and Y, where M is a metallic magnetic material consisting of Fe, Co, and/or Ni, X being element or elements other than M and Y, and Y being F, N, and/or O.

In the example being illustrated, the sheet-like magnetic loss layer 88 is a layer of a composition $Fe_{72}Al_{11}O_{17}$ as exemplified by the above-mentioned Example 1. The sheet-like magnetic loss layer 88 having the last-mentioned composition has a superior absorption characteristic of electromagnetic waves in a frequency band, in particular, between a frequency band of MHz and a frequency band of GHz and can efficiently suppress the electromagnetic waves in the above-mentioned frequency band generated from the PDP 80.

In addition, inasmuch as the sheet-like magnetic loss layer 88 is combination having an extremely large magnetic loss, it is possible to particularly thin the magnetic loss layer 88 in comparison with a conventional sheet-like wave absorber. Accordingly, the sheet-like magnetic loss layer 88 may have a thickness of several tens of microns or less. At about 3 GHz, the absorption characteristic of the electromagnetic waves in the sheet-like magnetic loss layer 88 has an absorption effect of the electromagnetic waves by nine through twelve decibels in all areas of a display surface thereof in comparison with a case of only the glass substrate like in the conventional PDP illustrated in FIG. 12. A method of manufacturing the sheet-like magnetic loss layer 88 may be sputtering process or vapor deposition process. In addition, the sheet-like magnetic loss layer 88 may be formed by a layer production process except for the above-mentioned sputtering process, for example, by chemical vapor deposition (CVD) process or the like.

In the manner which is described above, it is possible to easily introduce a fabrication process of the above-mentioned sheet-like magnetic loss layer 88 into a whole fabrication process of the PDP 80.

Figure 15:
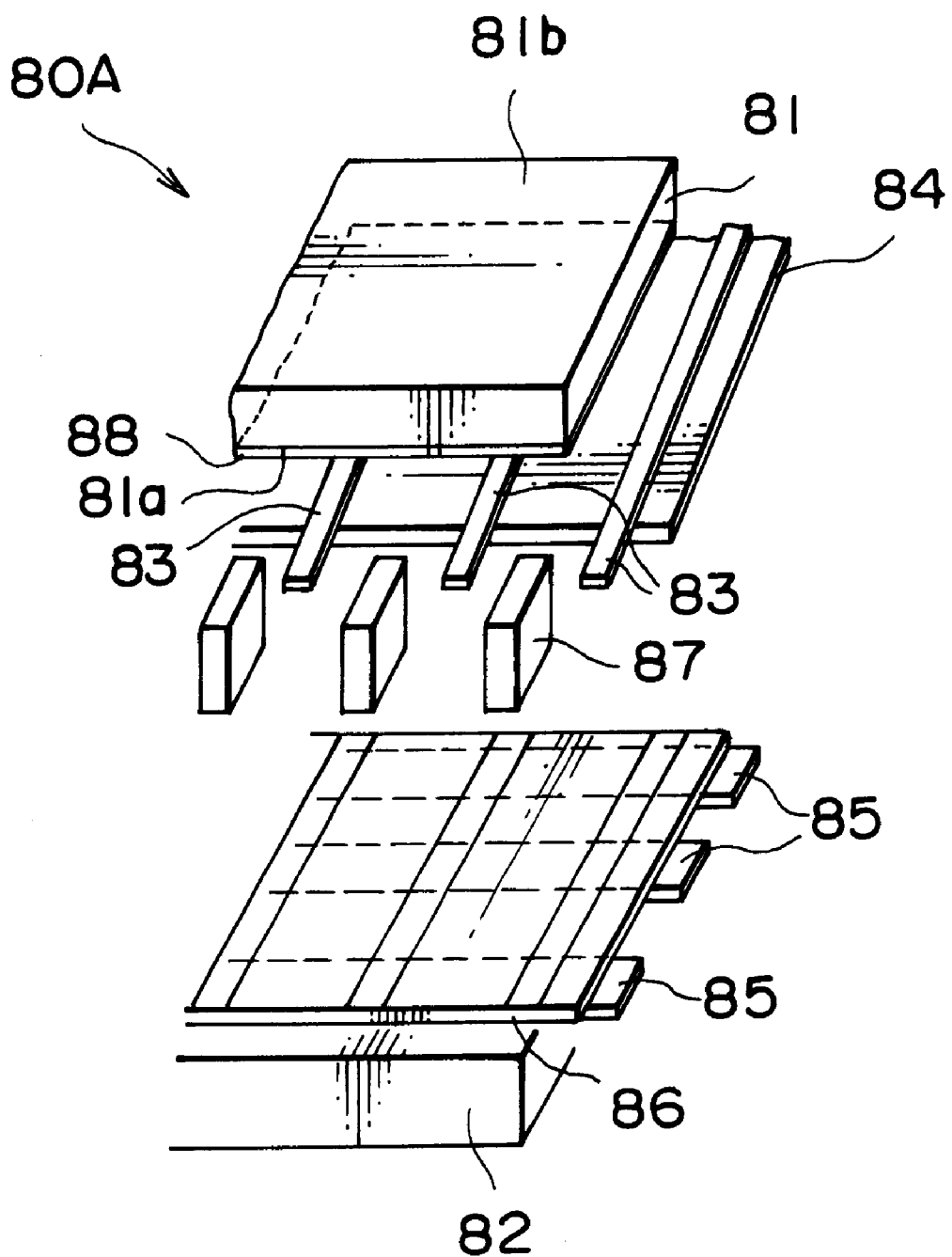
FIG. 15 is an exploded perspective view of a part of a plasma display panel according to a second embodiment of this invention.

Referring to FIG. 15, the description will proceed to a plasma display panel (PDP) 80A according to a second embodiment of this invention. The plasma display panel 80A is similar in structure and operation to the plasma display panel 80 illustrated in FIG. 14 except that the sheet-like magnetic loss layer 88 is formed on the front inner surface 81a of the front substrate 81 in lieu of the front outer surface 81b of the front substrate 81. With this structure, the plasma display panel 80A has similar merits to the plasma display panel 80 illustrated in FIG. 14.

Figure 16:
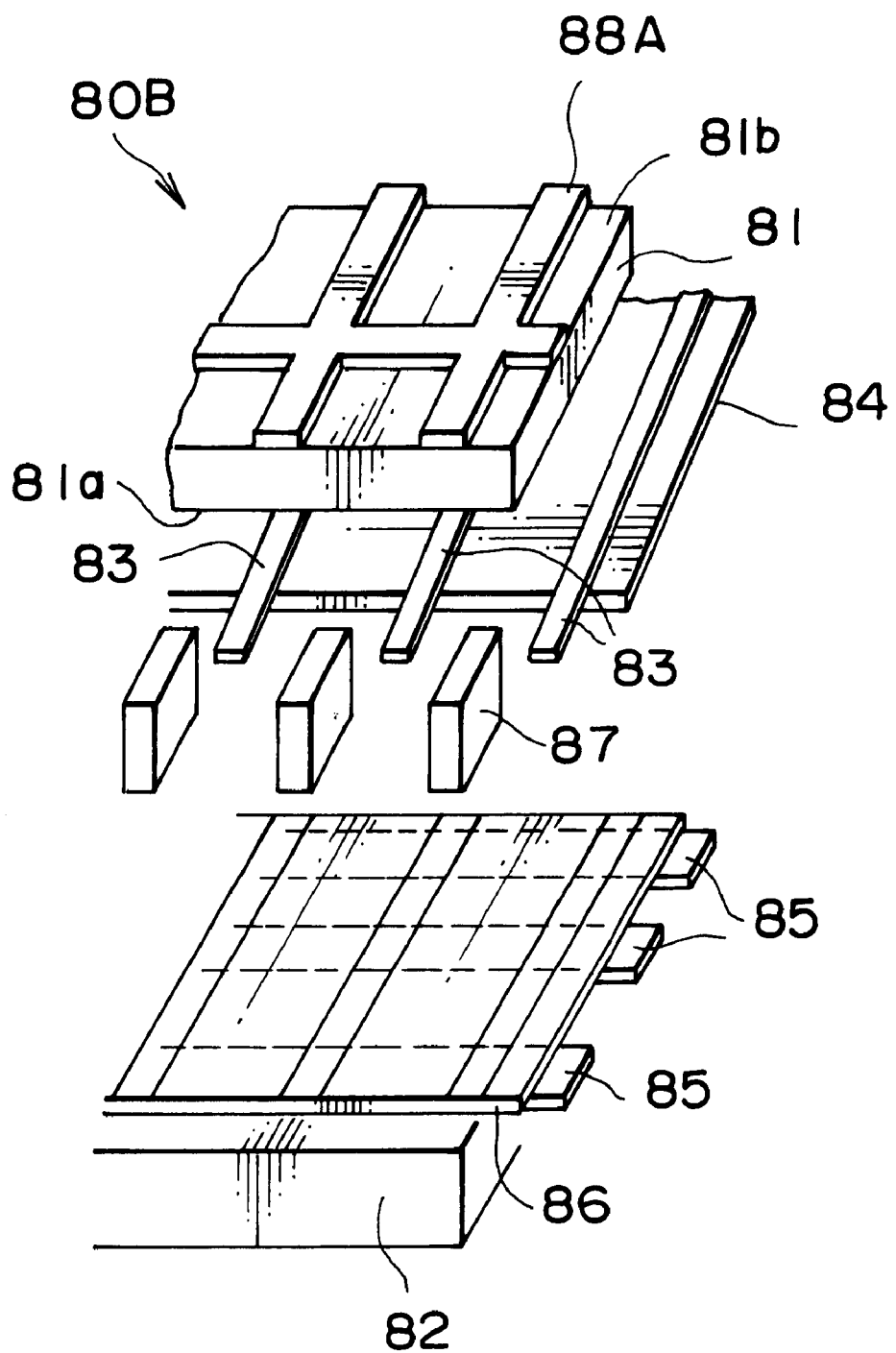
FIG. 16 is an exploded perspective view of a part of a plasma display panel according to a third embodiment of this invention.

Referring to FIG. 16, the description will proceed to a plasma display panel (PDP) 80B according to a third embodiment of this invention. The plasma display panel 80B is similar in structure and operation to the plasma display panel 80 illustrated in FIG. 14 except that the magnetic loss layer is modified from that illustrated in FIG. 14 as will later become clear. The magnetic loss layer is therefore depicted at 88A.

The magnetic loss layer 88A is formed in a lattice fashion. In other words, the magnetic loss layer 88A is a latticed magnetic loss layer. The latticed magnetic loss layer 88A may preferably be arranged so as to correlate arrangement of the front electrodes 83 and arrangement of the rear electrodes 85.

The latticed magnetic loss layer 88A is made of a magnetic substance which is similar to that of the sheet-like magnetic loss layer 88 illustrated in FIG. 14. The latticed magnetic loss layer 88A has a superior absorption characteristic of electromagnetic waves in a frequency band, in particular, between a frequency band of MHz and a frequency band of GHz and can efficiently suppress the electromagnetic waves in the above-mentioned frequency band generated from the PDP 80B. In addition, inasmuch as the magnetic loss layer 88A is combination having an extremely large magnetic loss, it is possible to particularly thin the latticed magnetic loss layer 88A in comparison with a conventional sheet-like wave absorber. Accordingly, the latticed magnetic loss layer 88A may have a thickness of several tens of microns or less. At about 3 GHz, the absorption characteristic of the electromagnetic waves in the latticed magnetic loss layer 88A has an absorption effect of the electromagnetic waves by nine through eleven decibels in all areas of a display surface thereof in comparison with a case of only the glass substrate like in the conventional PDP 80' illustrated in FIG. 12.

A method of manufacturing the latticed magnetic loss layer 88A may be sputtering process using a mask or a combination of the sputtering process and patterning process. In addition, the latticed magnetic loss layer 88A may be formed by a layer production process except for the above-mentioned sputtering process, for example, by chemical vapor deposition (CVD) process or the like.

In the manner which is described above, it is possible to easily introduce a fabrication process of the above-mentioned latticed magnetic loss layer 88A into a whole fabrication process of the PDP 80B.

Figure 17:
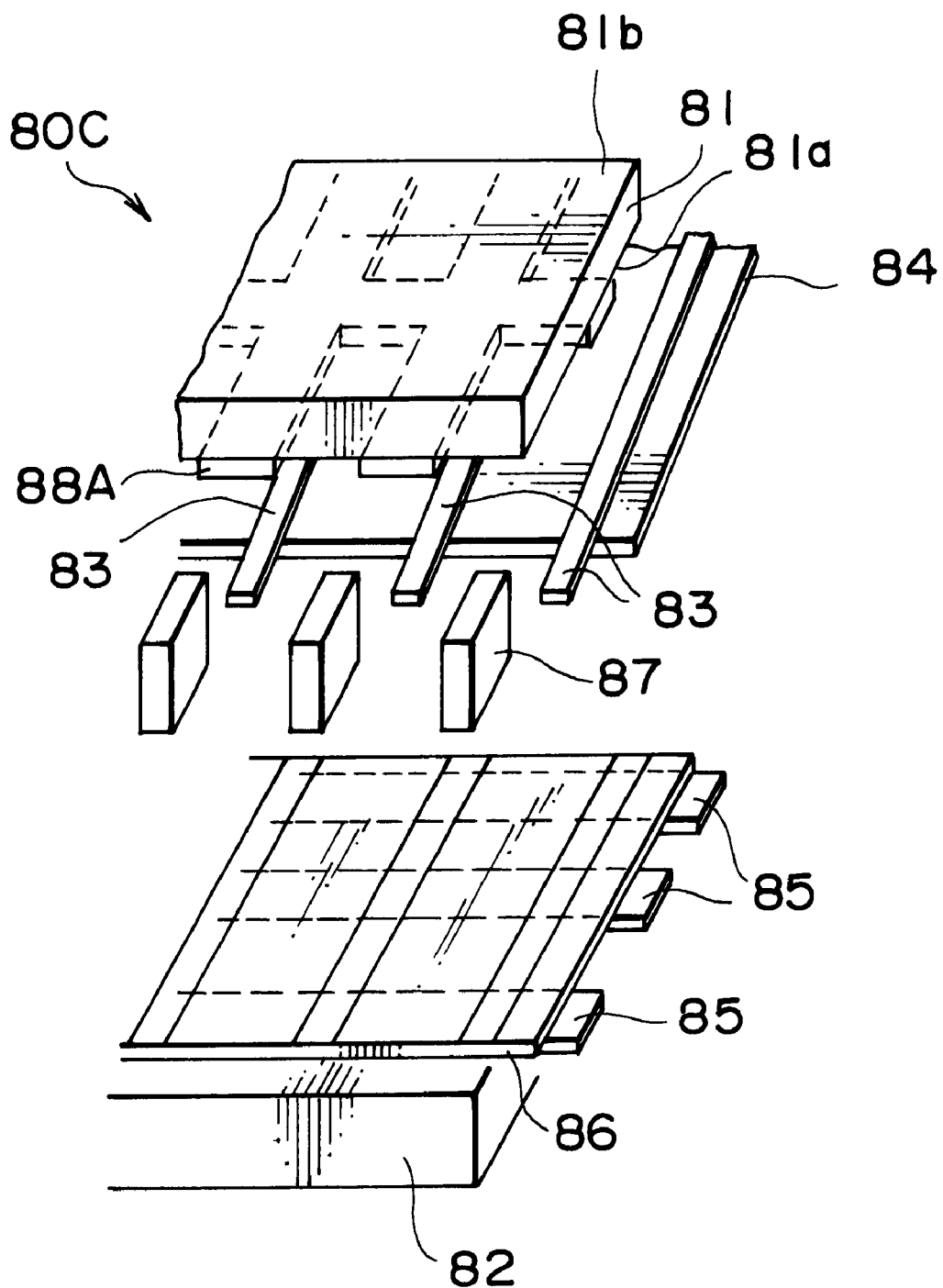
FIG. 17 is an exploded perspective view of a part of a plasma display panel according to a fourth embodiment of this invention.

Referring to FIG. 17, the description will proceed to a plasma display panel (PDP) 80C according to a fourth embodiment of this invention. The plasma display panel 80C is similar in structure and operation to the plasma display panel 80B illustrated in FIG. 16 except that the latticed magnetic loss layer 88A is formed on the front inner surface 81a of the front substrate 81 in lieu of the front outer surface 81b of the front substrate 81. With this structure, the plasma display panel 80C has similar merits to the plasma display panel 80B illustrated in FIG. 16.

Figure 18:
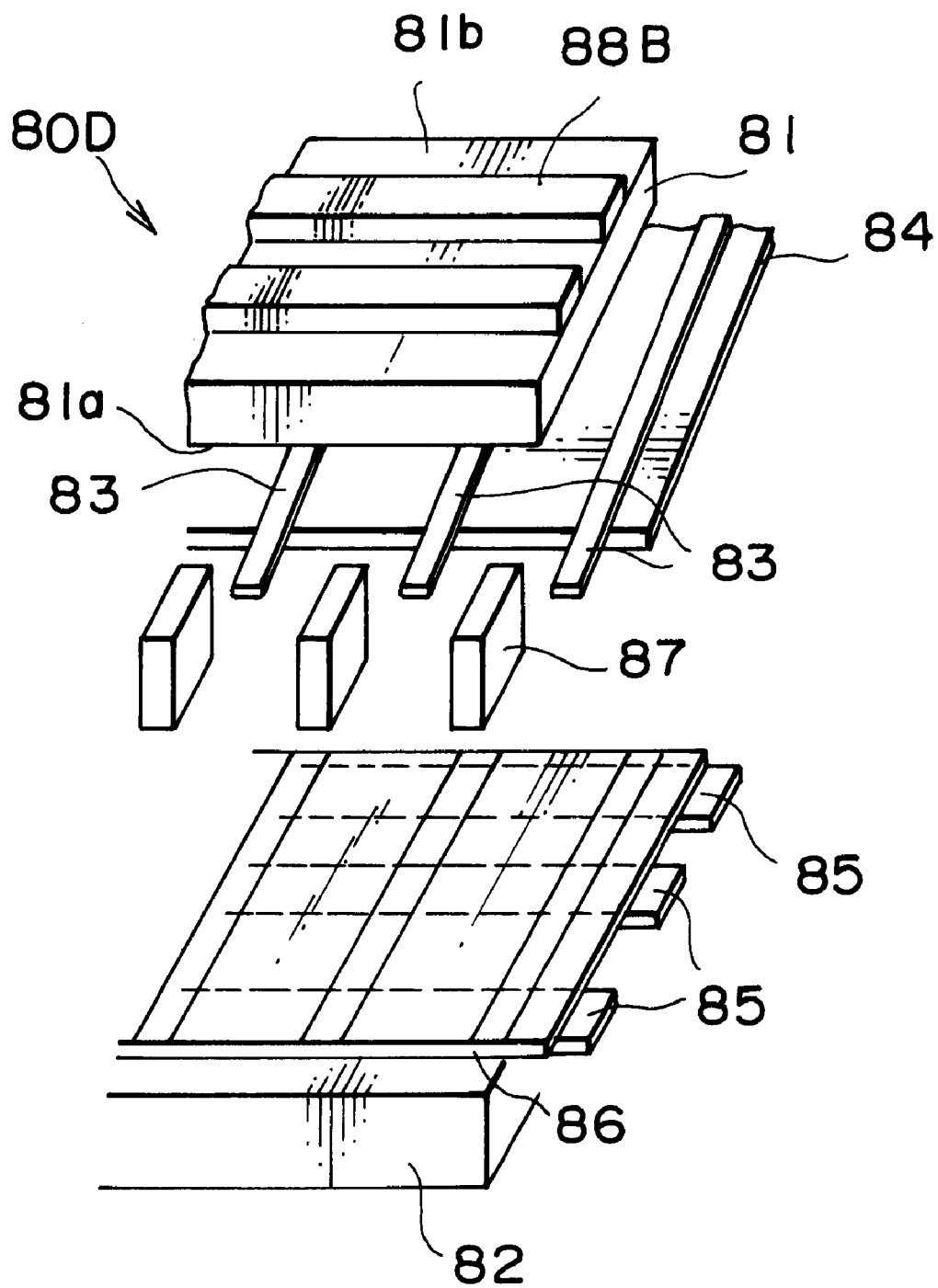
FIG. 18 is an exploded perspective view of a part of a plasma display panel according to a fifth embodiment of this invention.

Referring to FIG. 18, the description will proceed to a plasma display panel (PDP) 80D according to a fifth embodiment of this invention. The plasma display panel 80D is similar in structure and operation to the plasma display panel 80B illustrated in FIG. 16 except that the magnetic loss layer is modified from that illustrated in FIG. 16 as will later become clear. The magnetic loss layer is therefore depicted at 88B.

The magnetic loss layer 88B is formed in a stripe fashion. In other words, the magnetic loss layer 88B is a striped magnetic loss layer. With this structure, the plasma display panel 80D has similar merits to the plasma display panel 80B illustrated in FIG. 16.

Figure 19:
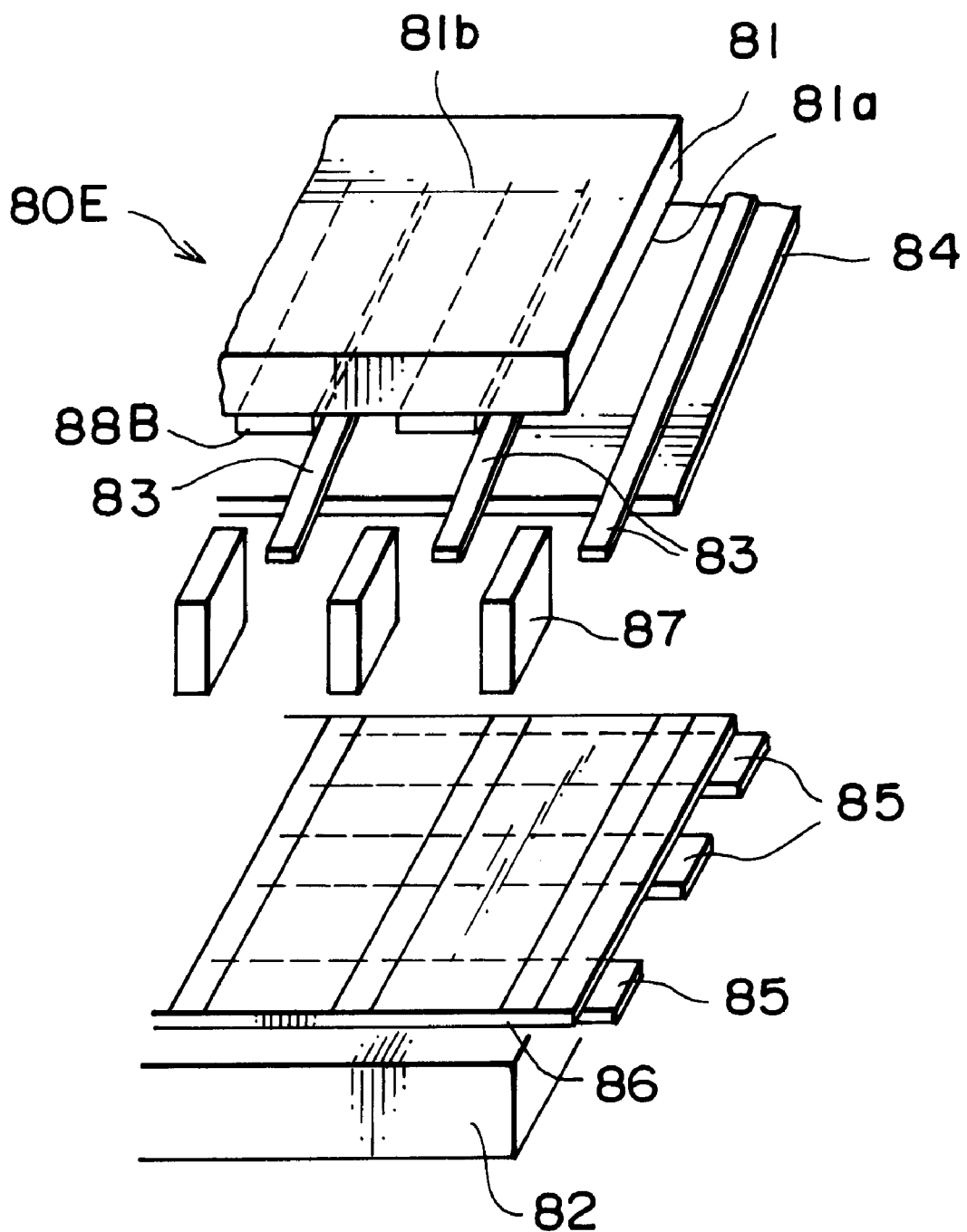
FIG. 19 is an exploded perspective view of a part of a plasma display panel according to a sixth embodiment of this invention.

Referring to FIG. 19, the description will proceed to a plasma display panel (PDP) 80E according to a sixth embodiment of this invention. The plasma display panel 80E is similar in structure and operation to the plasma display panel 80D illustrated in FIG. 18 except that the striped magnetic loss layer 88B is formed on the front inner surface 81a of the front substrate 81 in lieu of the front outer surface 81b of the front substrate 81. With this structure, the plasma display panel 80E has similar merits to the plasma display panel 80D illustrated in FIG. 18.

Figure 20:
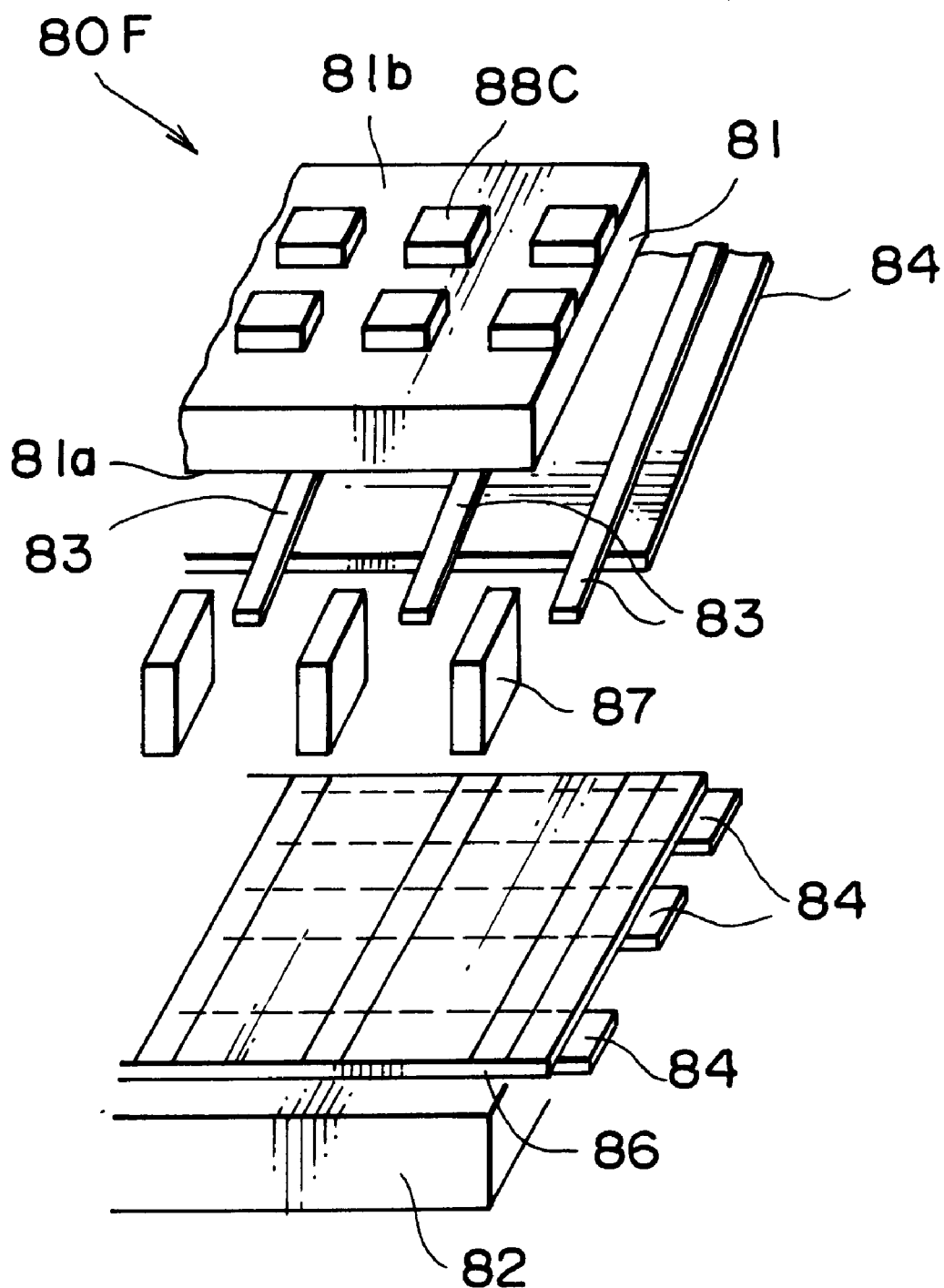
FIG. 20 is an exploded perspective view of a part of a plasma display panel according to a seventh embodiment of this invention.

Referring to FIG. 20, the description will proceed to a plasma display panel (PDP) 80F according to a seventh embodiment of this invention. The plasma display panel 80F is similar in structure and operation to the plasma display panel 80 illustrated in FIG. 14 except that the magnetic loss layer is modified from that illustrated in FIG. 14 as will later become clear. The magnetic loss layer is therefore depicted at 88C.

The magnetic loss layer 88C is formed in a speck fashion. In other words, the magnetic loss layer 88C is a specked magnetic loss layer. The specked magnetic loss layer 88C may preferably be arranged so as to correlate arrangement of the front electrodes 83 and arrangement of the rear electrodes 85.

The specked magnetic loss layer 88C is made of a magnetic substance which is similar to that of the sheet-like magnetic loss layer 88 illustrated in FIG. 14. The specked magnetic loss layer 88C has a superior absorption characteristic of electromagnetic waves in a frequency band, in particular, between a frequency band of MHz and a frequency band of GHz and can efficiently suppress the electromagnetic waves in the above-mentioned frequency band generated from the PDP 80F. In addition, inasmuch as the specked magnetic loss layer 88C is combination having an extremely large magnetic loss, it is possible to particularly thin the specked magnetic loss layer 88C in comparison with a conventional sheet-like wave absorber. Accordingly, the specked magnetic loss layer 88C may have a thickness of several tens of microns or less. At about 3 GHz, the absorption characteristic of the electromagnetic waves in the specked magnetic loss layer 88C has an absorption effect of the electromagnetic waves by nine through twelve decibels in all areas of a display surface thereof in comparison with a case of only the glass substrate like in the conventional PDP 80' illustrated in FIG. 12.

A method of manufacturing the specked magnetic loss layer 88C may be sputtering process using a mask or a combination of the sputtering process and patterning process. The method of manufacturing the specked magnetic loss layer 88C may be vapor deposition process using a mask or a combination of the vapor deposition process and patterning process. In addition, the method of manufacturing the specked magnetic loss layer 88C may be a screen printing using a mask. Furthermore, the specked magnetic loss layer 88C may be formed by a layer production process except for the above-mentioned sputtering process, for example, by chemical vapor deposition (CVD) process or the like.

In the manner which is described above, it is possible to easily introduce a fabrication process of the above-mentioned specked magnetic loss layer 88C into a whole fabrication process of the PDP 80F.

Figure 21:
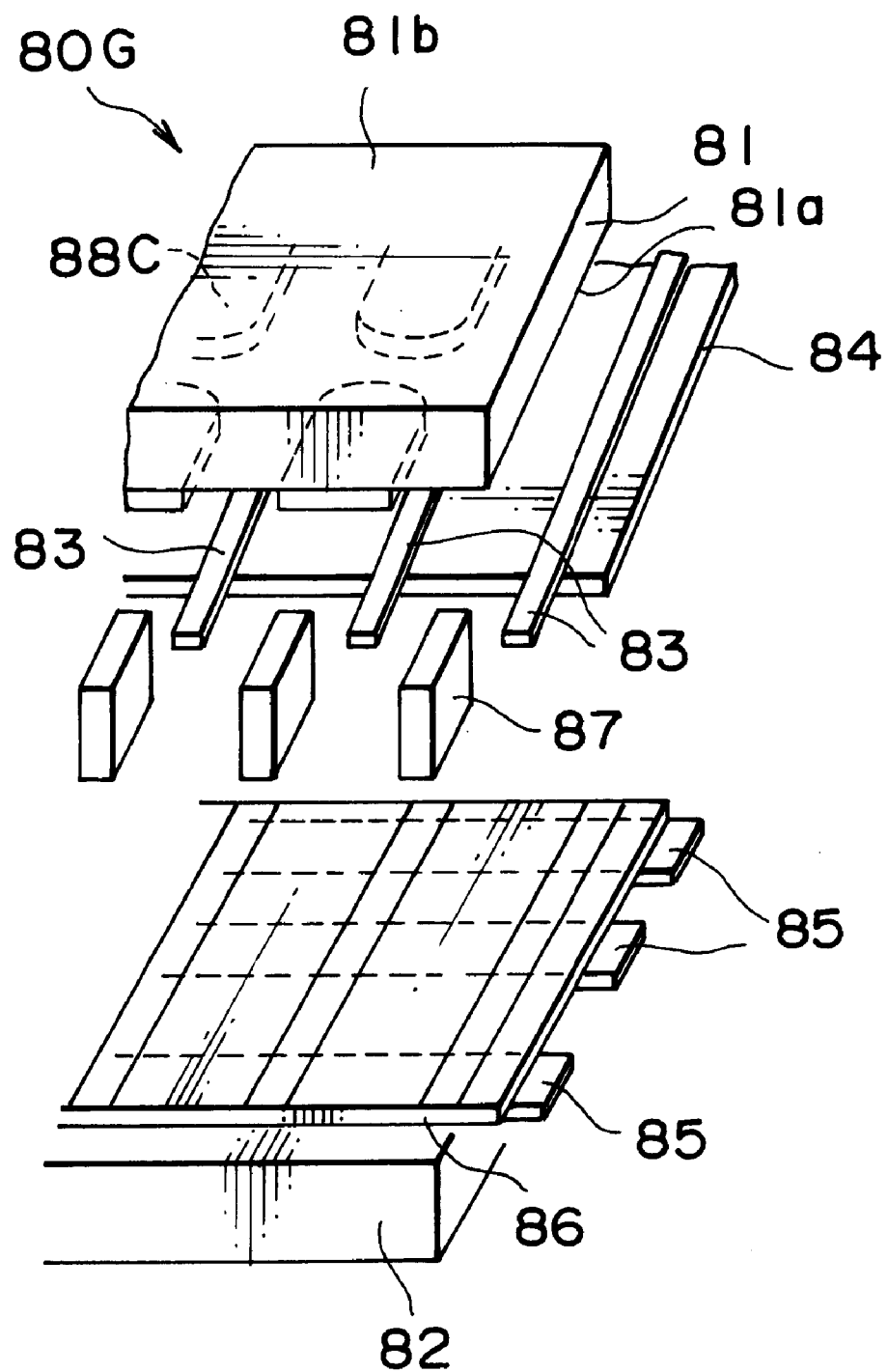
FIG. 21 is an exploded perspective view of a part of a plasma display panel according to an eighth embodiment of this invention.

Referring to FIG. 21, the description will proceed to a plasma display panel (PDP) 80G according to an eighth embodiment of this invention. The plasma display panel 80G is similar in structure and operation to the plasma display panel 80F illustrated in FIG. 20 except that the specked magnetic loss layer 88C is formed on the front inner surface 81a of the front substrate 81 in lieu of the front outer surface 81b of the front substrate 81. With this structure, the plasma display panel 80G has similar merits to the plasma display panel 80F illustrated in FIG. 20.

Figure 22:
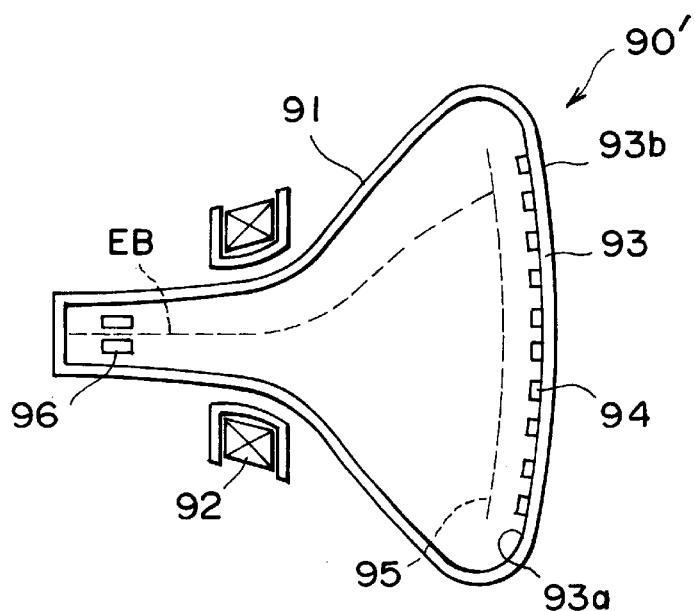
FIG. 22 is a sectional view of a conventional cathode-ray tube (CRT) display device.

Referring to FIG. 22, the description will proceed to a conventional cathode-ray tube (CRT) display device 90' used as another one of the display devices. In the manner known in the art, the cathode-ray tube display device 90' is used, for example, as a television CMV picture tube of a television set, a monitor for a personal computer, or the like. Originally, a cathode-ray tube (CRT) is known as Braun tube or as an electron-ray tube. The CRT display device 90' comprises a cathode-ray tube 91 or a glass vessel having an evacuated space inside and a deflecting yoke 92. The cathode-ray tube 91 comprises a display panel 93 having an inner surface 93a and an outer surface 93b, fluorescent substances or phosphor 94 having a predetermined pattern formed on the inner surface 93a of the display panel 93, a shadow mask 95 opposite to the display panel 93 with the fluorescent substances 94 disposed therebetween, and an electron gun 96. The display panel 93 acts as the display window. The electron gun 96 radiates an electron beam EB which passes through one of hollow holes of the shadow mask 95 and hits on a position of the fluorescent substances 94 to make the position of the fluorescent substances 94 emit.

Figure 23:
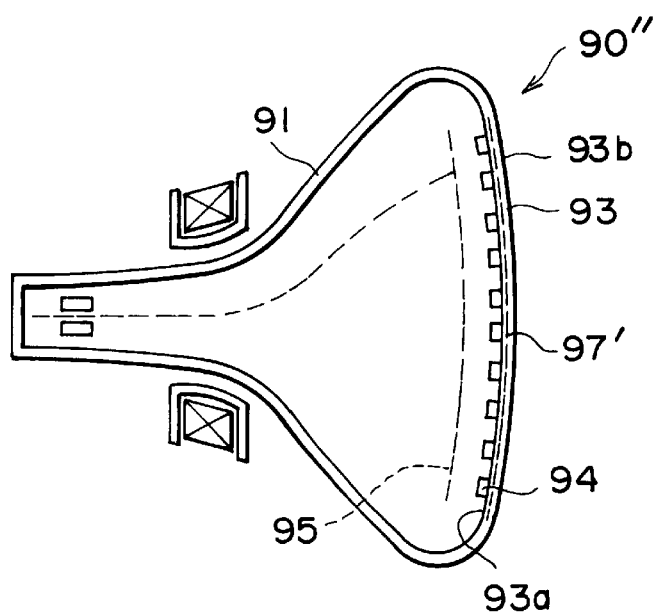
FIG. 23 is a sectional view of another conventional cathode-ray tube (CRT) display device in which a noise measure is taken.

The CRT display device 90' generates or radiates interference electromagnetic waves when the electron beam EB hits on the position of the fluorescent substances 94 to make the position of the fluorescent substances 94 emit. As a measure for suppressing the interference electromagnetic waves in the conventional CRT display device 90', as illustrated in another conventional CRT display device 90" of FIG. 23, a conductive mesh 97' is embedded in the display panel 93 in the cathode-ray tube 91.

However, the CRT display device 90" provided with the conductive mesh 97' is disadvantageous in that image quality of the CRT display device 90" is degraded because the conductive mesh 97' interrupts emission in the fluorescent substances 94 and the conductive mesh 97' has a low absorption efficiency of the interference electromagnetic waves if the conductive mesh 97' has a low arrangement density in order to improve the image quality. The CRT display device 90" provided with the conductive mesh 97' is also disadvantageous in that a production cost thereof becomes high to embed the conductive mesh 97' in the display panel 93. Furthermore, the conductive mesh 97' has a frequency band enable to absorb the electromagnetic waves that is restricted up to a frequency band of the order of MHz. That is, the CRT display device 90" provided with the conductive mesh 97' is disadvantageous in that the conductive mesh 97' cannot cope with absorption of the electromagnetic waves up to a frequency band of the order of GHz which becomes an issue in resent years, as also mentioned in the preamble of the instant specification.

Figure 24:
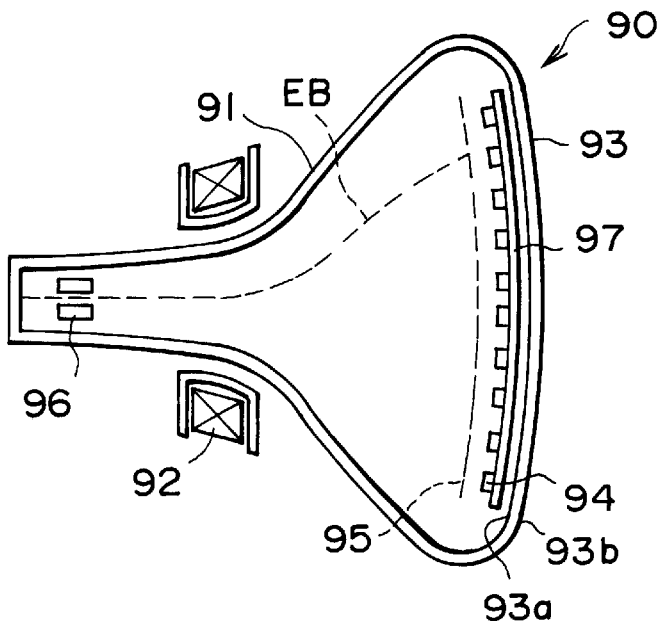
FIG. 24 is a sectional view of a cathode-ray tube (CRT) display device according to a first embodiment of this invention.
Figure 25:
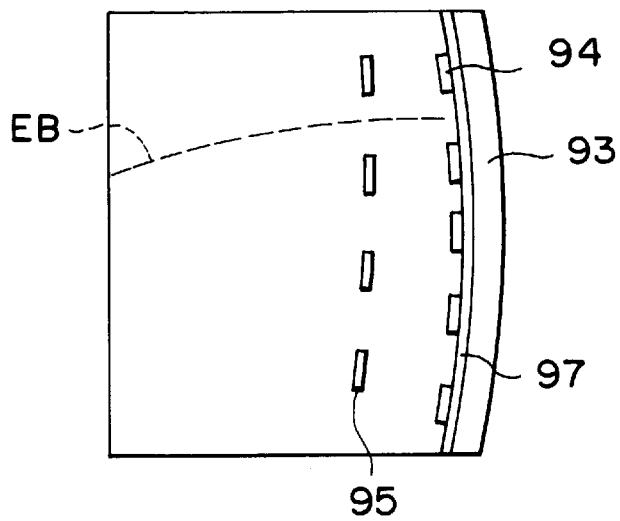
FIG. 25 is an expanded sectional view of a neighborhood of a display panel for use in the CRT display device illustrated in FIG. 24.
Figure 26:
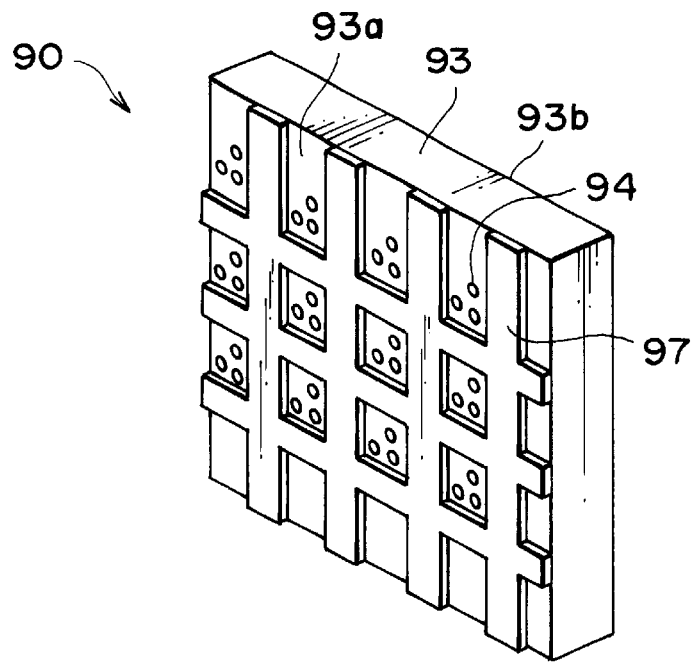
FIG. 26 is an enlarged perspective view of a part of a display panel for use in the display device illustrated in FIG. 24.

Referring to FIGS. 24, 25, and 26, the description will proceed to a cathode-ray tube (CRT) display device 90 according to a first embodiment of this invention. The CRT display device 90 is similar in structure and operation to the conventional CRT display device 90' illustrated in FIG. 22 except that the CRT display device 90 further comprises a magnetic loss layer 97.

The magnetic loss layer 97 is formed on the inner surface 93a of the display panel 93. In the example being illustrated in FIG. 26, the magnetic loss layer 97 is formed in a lattice fashion. In other words, the magnetic loss layer 97 is a latticed magnetic loss layer. Such a latticed magnetic loss layer 97 may suitably be selected in accordance with a size and a shape of the CRT 91 and an intended purpose of the CRT display device.

The latticed magnetic loss layer 97 is made of a magnetic substance of a magnetic composition comprising M, X and Y, where M is a metallic magnetic material consisting of Fe, Co, and/or Ni, X being element or elements other than M and Y, and Y being F, N, and/or O. In the example being illustrated, the sheet-like magnetic loss layer 97 is a layer of a composition $Fe_{72}Al_{11}O_{17}$ as exemplified by the above-mentioned Example 1.

The latticed magnetic loss layer 97 having the last-mentioned composition has a superior absorption characteristic of electromagnetic waves in a frequency band, in particular, between a frequency band of MHz and a frequency band of GHz and can efficiently suppress the electromagnetic waves in the above-mentioned frequency band generated from the CRT display device 90.

In addition, inasmuch as the latticed magnetic loss layer 97 is combination having an extremely large magnetic loss, it is possible to particularly thin the latticed magnetic loss layer 97 in comparison with a conventional sheet-like wave absorber. Accordingly, the latticed magnetic loss layer 97 may have a thickness of several tens of microns or less.

At about 3 GHz, the absorption characteristic of the electromagnetic waves in the latticed magnetic loss layer 97 has an absorption effect of the electromagnetic waves by about ten decibels in comparison with a case of only the glass vessel like in the conventional CRT display device 90' illustrated in FIG. 22.

A method of manufacturing the latticed magnetic loss layer 97 may be sputtering process or vapor deposition process using a metallic mask. Specifically, the method of manufacturing the latticed magnetic loss layer 97 comprises the steps of carrying out the sputtering process or the vapor deposition process using the metallic mask and of removing the metallic mask to form a predetermined pattern. The method of manufacturing the latticed magnetic loss layer 97 may be a combination of the sputtering process and patterning process. Specifically, the method of manufacturing the latticed magnetic loss layer 97 comprises the steps of carrying out the sputtering process or the vapor deposition process and of carrying out lithography using a resist to form a predetermined pattern. In addition, the latticed magnetic loss layer 97 may be formed by a layer production process except for the above-mentioned sputtering process, for example, by chemical vapor deposition (CVD) process or the like.

In the manner which is easily understood from the above-description, it is possible to easily introduce a fabrication process of the above-mentioned latticed magnetic loss layer 97 in the similar manner in that of the fluorescent substances 94 into a whole fabrication process of the CRT display device 90.

Figure 27:
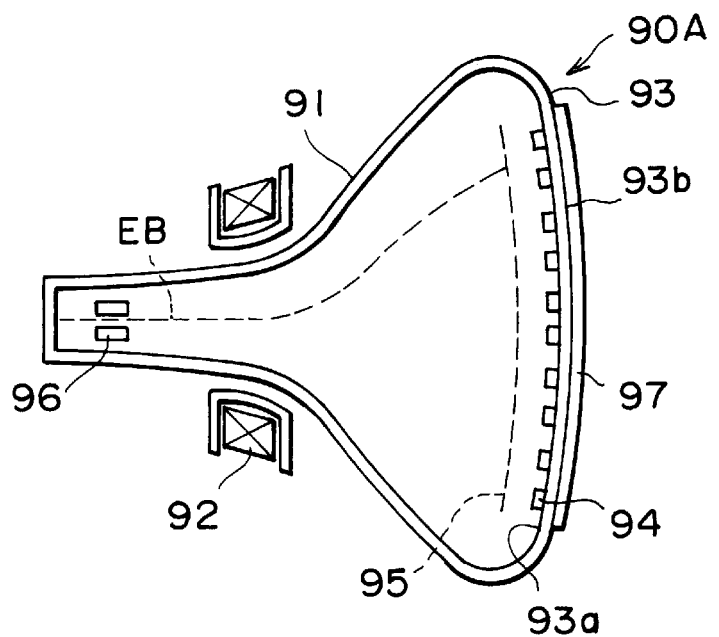
FIG. 27 is a sectional view of a cathode-ray tube (CRT) display device according to a second embodiment of this invention.
Figure 28:
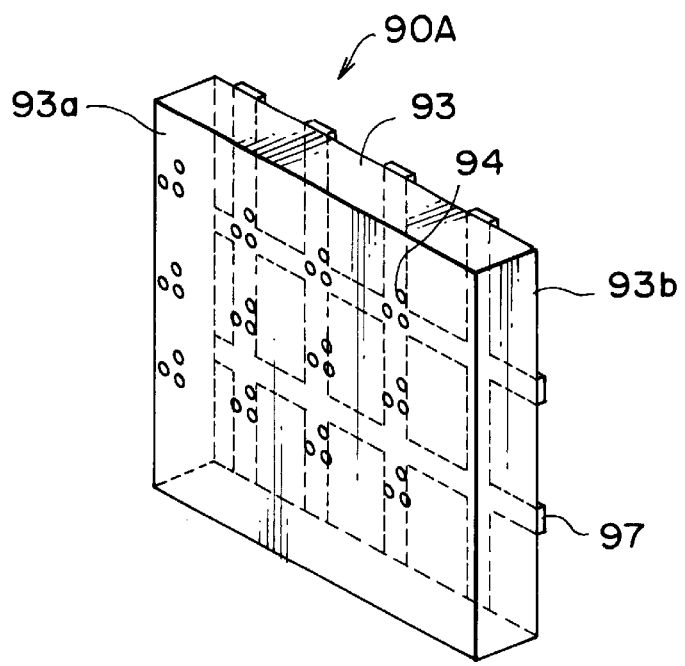
FIG. 28 is an enlarged perspective view of a part of a display panel for use in the CRT display device illustrated in FIG. 27.

Referring to FIGS. 27 and 28, the description will proceed to a cathode-ray tube (CRT) display device 90A according to a second embodiment of this invention. The CRT display device 90A is similar in structure and operation to the CRT display device 90 illustrated in FIGS. 24 through 26 except that the latticed magnetic loss layer 97 is formed on the outer surface 93b of the display panel 93 in lieu of the inner surface 93a of the display panel 93. With this structure, the CRT display device 90A has similar merits to the CRT display device 90 illustrated in FIGS. 24 through 25.

In addition, at about 3 GHz, the absorption characteristic of the electromagnetic waves in the latticed magnetic loss layer 97 has an absorption effect of the electromagnetic waves by about seven decibels in comparison with a case of only the glass vessel like in the conventional CRT display device 90' illustrated in FIG. 22. The reason why the absorption effect of the electromagnetic waves is decreased by about three decibels in a case of the CRT display device 90 illustrated in FIGS. 24 through 26 is because the fluorescent substances 94 and the latticed magnetic loss layer 97 are apart from each other by a distance corresponding to a thickness of the display panel 93 of the CRT 91.

In the manner which is easily understood from the above-description, it is possible to easily introduce a fabrication process of the above-mentioned latticed magnetic loss layer 97 into any stage within a whole fabrication process of the CRT display device 90A.

Figure 29:
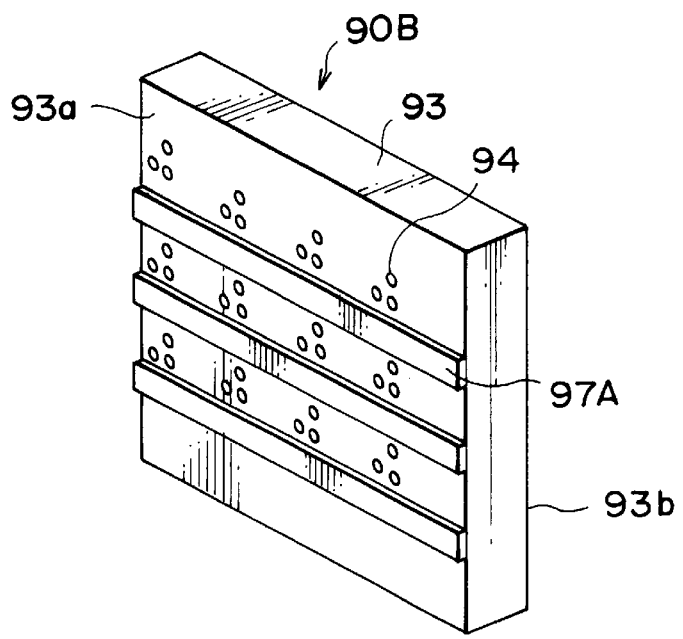
FIG. 29 is an enlarged perspective view of a part of a display panel for use in a cathode-ray tube (CRT) display device according to a third embodiment of this invention.

Referring to FIG. 29, the description will proceed to a cathode-ray tube (CRT) display device 90B according to a third embodiment of this invention. The CRT display device 90B is similar in structure and operation to the CRT display device 90 illustrated in FIG. 26 except that the magnetic loss layer is modified from that illustrated in FIG. 26 as will later become clear. The magnetic loss layer is therefore depicted at 97A.

The magnetic loss layer 97A is formed in a stripe fashion. In other words, the magnetic loss layer 97A is a striped magnetic loss layer. With this structure, the CRT display device 90B has similar merits to the CRT display device 90 illustrated in FIG. 26.

Figure 30:
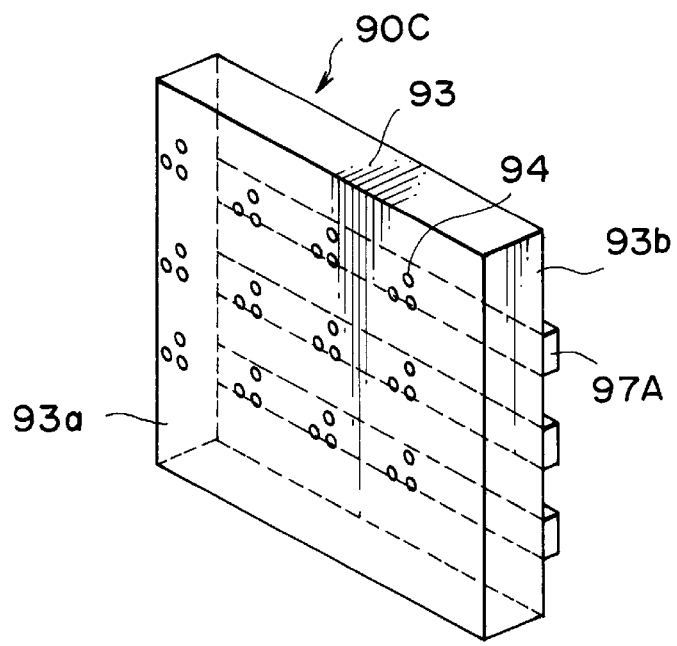
FIG. 30 is an enlarged perspective view of a part of a display panel for use in a cathode-ray tube (CRT) display device according to a fourth embodiment of this invention.

Referring to FIG. 30, the description will proceed to a cathode-ray tube (CRT) display device 90C according to a fourth embodiment of this invention. The CRT display device 90C is similar in structure and operation to the CRT display device 90B illustrated in FIG. 29 except that the striped magnetic loss layer 97A is formed on the outer surface 93b of the display panel 93 in lieu of the inner surface 93a of the display panel 93. With this structure, the CRT display device 90C has similar merits to the CRT display device 90A illustrated in FIG. 28.

Figure 31:
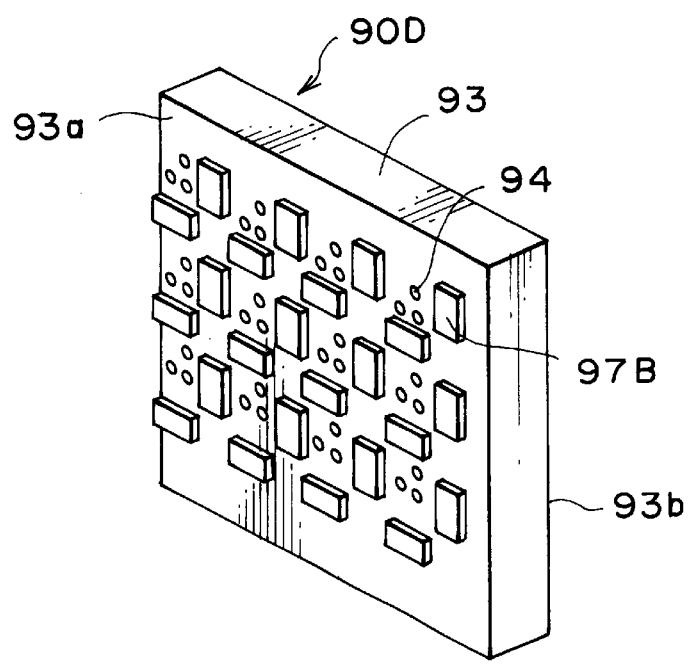
FIG. 31 is an enlarged perspective view of a part of a display panel for use in a cathode-ray tube (CRT) display device according to a fifth embodiment of this invention.

Referring to FIG. 31, the description will proceed to a cathode-ray tube (CRT) display device 90D according to a fifth embodiment of this invention. The CRT display device 90D is similar in structure and operation to the CRT display device 90 illustrated in FIG. 26 except that the magnetic loss layer is modified from that illustrated in FIG. 26 as will later become clear. The magnetic loss layer is therefore depicted at 97B.

The magnetic loss layer 97B is formed in a speck fashion. In other words, the magnetic loss layer 97B is a specked magnetic loss layer. Such a specked magnetic loss layer 97B may suitably be selected in accordance with a size and a shape of the CRT 91 and an intended purpose of the CRT display device.

The specked magnetic loss layer 97B is made of a magnetic substance which is similar to that of the latticed magnetic loss layer 97 illustrated in FIG. 26. The specked magnetic loss layer 97B has a superior absorption characteristic of electromagnetic waves in a frequency band, in particular, between a frequency band of MHz and a frequency band of GHz and can efficiently suppress the electromagnetic waves in the above-mentioned frequency band generated from the CRT display device 90D. In addition, inasmuch as the specked magnetic loss layer 97B is combination having an extremely large magnetic loss, it is possible to particularly thin the specked magnetic loss layer 97B in comparison with a conventional sheet-like wave absorber. Accordingly, the specked magnetic loss layer 97B may have a thickness of several tens of microns or less. At about 3 GHz, the absorption characteristic of the electromagnetic waves in the specked magnetic loss layer 97B has an absorption effect of the electromagnetic waves by about ten decibels in comparison with a case of only the glass vessel like in the conventional CRT display device 90' illustrated in FIG. 22.

A method of manufacturing the specked magnetic loss layer 97B may be sputtering process or vapor deposition process using a metallic mask. Specifically, the method of manufacturing the specked magnetic loss layer 97B comprises the steps of carrying out the sputtering process or the vapor deposition process using the metallic mask and of removing the metallic mask to form a predetermined pattern. The method of manufacturing the specked magnetic loss layer 97B may be a combination of the sputtering process and patterning process. Specifically, the method of manufacturing the specked magnetic loss layer 97B comprises the steps of carrying out the sputtering process or the vapor deposition process and of carrying out lithography using a resist to form a predetermined pattern. In addition, the specked magnetic loss layer 97B may be formed by a layer production process except for the above-mentioned sputtering process, for example, by chemical vapor deposition (CVD) process or the like.

In the manner which is easily understood from the above-description, it is possible to easily introduce a fabrication process of the above-mentioned specked magnetic loss layer 97B in the similar manner in that of the fluorescent substances 94 into a whole fabrication process of the CRT display device 90D.

Figure 32:
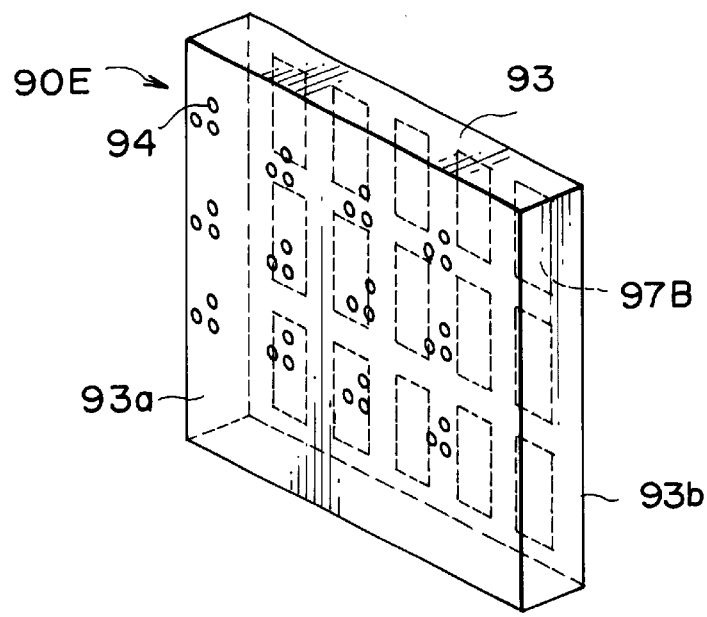
FIG. 32 is an enlarged perspective view of a part of a display panel for use in a cathode-ray tube (CRT) display device according to a sixth embodiment of this invention.

Referring to FIG. 32, the description will proceed to a cathode-ray tube (CRT) display device 90E according to a sixth embodiment of this invention. The CRT display device 90E is similar in structure and operation to the CRT display device 90D illustrated in FIG. 31 except that the specked magnetic loss layer 97B is formed on the outer surface 93b of the display panel 93 in lieu of the inner surface 93a of the display panel 93. With this structure, the CRT display device 90E has similar merits to the CRT display device 90C illustrated in FIG. 30.

Figure 33:
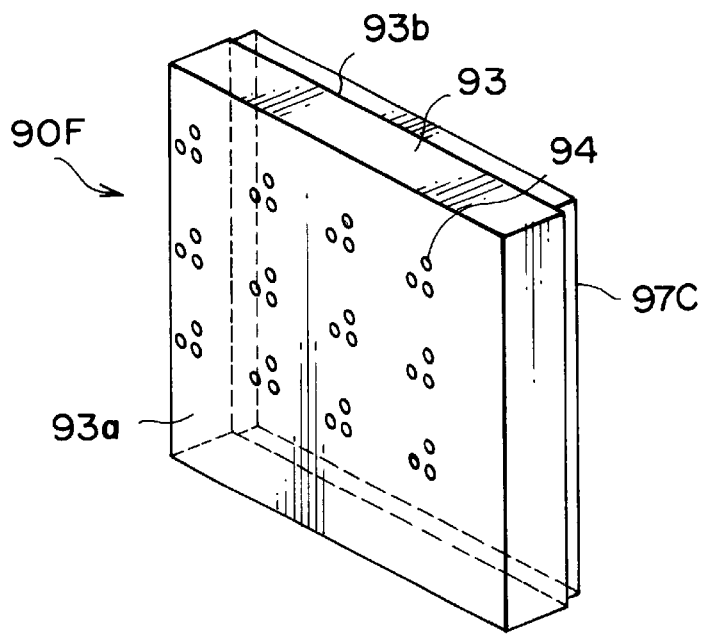
FIG. 33 is an enlarged perspective view of a part of a display panel for use in a cathode-ray tube (CRT) display device according to a seventh embodiment of this invention.

Referring to FIG. 33, the description will proceed to a cathode-ray tube (CRT) display device 90F according to a seventh embodiment of this invention. The CRT display device 90F is similar in structure and operation to the CRT display device 90A illustrated in FIG. 28 except that the magnetic loss layer is modified from that illustrated in FIG. 28 as will later become clear. The magnetic loss layer is therefore depicted at 97C.

The magnetic loss layer 97C is formed in a mat fashion. In other words, the magnetic loss layer 97C is a sheet-like magnetic loss layer. Such a sheet-like magnetic loss layer 97C may suitably be selected in accordance with a size and a shape of the CRT 91 and an intended purpose of the CRT display device.

A method of manufacturing the sheet-like magnetic loss layer 97C may be sputtering process or vapor deposition process. In addition, the sheet-like magnetic loss layer 97C may be formed by a layer production process except for the above-mentioned sputtering process, for example, by chemical vapor deposition (CVD) process or the like.

In the manner which is easily understood from the above-description, it is possible to easily introduce a fabrication process of the above-mentioned sheet-like magnetic loss layer 97C into any stage within a whole fabrication process of the CRT display device 90F.

With this structure, the CRT display device 90F has similar merits to the CRT display device 90A illustrated in FIG. 28.

While this invention has thus for been described in conjunction with preferred embodiments thereof, it will now be readily possible for those skilled in the art to put this invention into various other manners. For example, display devices to which this invention is applicable are not restricted to those in the above-mentioned embodiments.

What is claimed is:

1. A cathode-ray tube (CRT) display device comprising a cathode-ray tube having a display panel with an inner surface, said CRT display device comprising a latticed magnetic loss layer formed on said inner surface, said latticed magnetic loss layer being a magnetic thin layer with a magnetic composition comprising M, X, and Y, wherein M is a metallic magnetic material consisting of at least one of Fe, Co, and Ni, X being one or more elements other than M and Y, and Y consisting of at least one of F, N, and O, particles of said metallic magnetic material M being distributed throughout a matrix consisting of X and Y.

2. A CRT display device as claimed in claim 1, wherein said latticed magnetic loss layer is deposited on said inner surface by a sputtering process using a mask.

3. A CRT display device as claimed in claim 1, wherein said latticed magnetic loss layer is deposited on said inner surface by a vapor deposition process using a mask.

4. A CRT display device as claimed in claim 1, wherein said latticed magnetic loss layer is deposited on said inner surface by a combination of a sputtering process and a patterning process.

5. A CRT display device as claimed in claim 1, wherein said latticed magnetic loss layer is deposited on said inner surface by a combination of a vapor deposition process and a patterning process.

6. A cathode-ray tube (CRT) display device comprising a cathode-ray tube having a display panel with an outer surface, said CRT display device comprising a latticed magnetic loss layer formed on said outer surface, said latticed magnetic loss layer being a magnetic thin layer with a magnetic composition comprising M, X, and Y, where M is a metallic magnetic material consisting of at least one of Fe, Co, and Ni, X being one or more elements other than M and Y consisting of at least one of F, N, and O, particles of said metallic magnetic material M being distributed throughout a matrix consisting of X and Y.

7. A CRT display device as claimed in claim 6, wherein said latticed magnetic loss layer is deposited on said inner surface by a sputtering process using a mask.

8. A CRT display device as claimed in claim 6, wherein said latticed magnetic loss layer is deposited on said inner surface by a vapor deposition process using a mask.

9. A CRT display device as claimed in claim 6, wherein said latticed magnetic loss layer is deposited on said inner surface by a combination of a sputtering process and a patterning process.

10. A CRT display device as claimed in claim 6, wherein said latticed magnetic loss layer is deposited on said inner surface by a combination of a vapor deposition process and a patterning process.

11. A cathode-ray tube (CRT) display device comprising a cathode-ray tube having a display panel with an inner surface, said CRT display device comprising a striped magnetic loss layer formed on said inner surface, said striped magnetic loss layer being a magnetic thin layer with a magnetic composition comprising M, X, and Y, where M is a metallic magnetic material consisting of at least one of Fe, Co, and Ni, X being one or more elements other than M and Y consisting of at least one of F, N, and O, particles of said metallic magnetic material M being distributed throughout a matrix consisting of X and Y.

12. A CRT display device as claimed in claim 11, wherein said striped magnetic loss layer is deposited on said inner surface by a sputtering process using a mask.

13. A CRT display device as claimed in claim 11, wherein said striped magnetic loss layer is deposited on said inner surface by a vapor deposition process using a mask.

14. A CRT display device as claimed in claim 11, wherein said striped magnetic loss layer is deposited on said inner surface by a combination of a sputtering process and a patterning process.

15. A CRT display device as claimed in claim 11, wherein said striped magnetic loss layer is deposited on said inner surface by a combination of a vapor deposition process and a patterning process.

16. A cathode-ray tube (CRT) display device comprising a cathode-ray tube having a display panel with an outer surface, said CRT display device comprising a striped magnetic loss layer formed on said outer surface, said striped magnetic loss layer being a magnetic thin layer with a magnetic composition comprising M, X, and Y, where M is a metallic magnetic material consisting of at least one of Fe, Co, and Ni, X being one or more elements other than M and Y consisting of at least one of F, N, and O, particles of said metallic magnetic material M being distributed throughout a matrix consisting of X and Y.

17. A CRT display device as claimed in claim 16, wherein said striped magnetic loss layer is deposited on said inner surface by a sputtering process using a mask.

18. A CRT display device as claimed in claim 16, wherein said striped magnetic loss layer is deposited on said inner surface by a vapor deposition process using a mask.

19. A CRT display device as claimed in claim 16, wherein said striped magnetic loss layer is deposited on said inner surface by a combination of a sputtering process and a patterning process.

20. A CRT display device as claimed in claim 16, wherein said striped magnetic loss layer is deposited on said inner surface by a combination of a vapor deposition process and a patterning process.

21. A cathode-ray tube (CRT) display device comprising a cathode-ray tube having a display panel with an inner surface, said CRT display device comprising a specked magnetic loss layer formed on said inner surface, said specked magnetic loss layer being a magnetic thin layer with a magnetic composition comprising M, X, and Y, where M is a metallic magnetic material consisting of at least one of Fe, Co, and Ni, X being one or more elements other than M and Y consisting of at least one of F, N, and O, particles of said metallic magnetic material M being distributed throughout a matrix consisting of X and Y.

22. A CRT display device as claimed in claim 21, wherein said specked magnetic loss layer is deposited on said inner surface by a sputtering process using a mask.

23. A CRT display device as claimed in claim 21, wherein said specked magnetic loss layer is deposited on said inner surface by a vapor deposition process using a mask.

24. A CRT display device as claimed in claim 21, wherein said specked magnetic loss layer is deposited on said inner surface by a combination of a sputtering process and a patterning process.

25. A CRT display device as claimed in claim 21, wherein said specked magnetic loss layer is deposited on said inner surface by a combination of a vapor deposition process and a patterning process.

26. A cathode-ray tube (CRT) display device comprising a cathode-ray tube having a display panel with an outer surface, said CRT display device comprising a specked magnetic loss layer formed on said outer surface, said specked magnetic loss layer being a magnetic thin layer with a magnetic composition comprising M, X, and Y, where M is a metallic magnetic material consisting of at least one of Fe, Co, and Ni, X being element or elements other than M and Y, and Y consisting of at least one of F, N, and O, particles of said metallic magnetic material M being uniformly or evenly distributed in a matrix consisting of X and Y.

27. A CRT display device as claimed in claim 26, wherein said specked magnetic loss layer is deposited on said inner surface by a sputtering process using a mask.

28. A CRT display device as claimed in claim 26, wherein said specked magnetic loss layer is deposited on said inner surface by a vapor deposition process using a mask.

29. A CRT display device as claimed in claim 26, wherein said specked magnetic loss layer is deposited on said inner surface by a combination of a sputtering process and a patterning process.

30. A CRT display device as claimed in claim 26, wherein said specked magnetic loss layer is deposited on said inner surface by a combination of a vapor deposition process and a patterning process.

31. A cathode-ray tube (CRT) display device comprising a cathode-ray tube having a display panel with an outer surface, said CRT display device comprising a magnetic loss layer formed on said outer surface, said sheet magnetic loss layer being a magnetic thin layer with a magnetic composition comprising M, X, and Y, where M is a metallic magnetic material consisting of at least one of Fe, Co, and Ni, X being one or more elements other than M and Y, and Y consisting of at least one of F, N, and O, particles of said metallic magnetic material M being distributed throughout a matrix consisting of X and Y.

32. A CRT display device as claimed in claim 31, wherein said specked magnetic loss layer is deposited on said inner surface by a sputtering process.

33. A CRT display device as claimed in claim 31, wherein said specked magnetic loss layer is deposited on said inner surface by a vapor deposition process.

* * * * *